(12) United States Patent
Hayashi et al.

(10) Patent No.: US 9,942,421 B2
(45) Date of Patent: Apr. 10, 2018

(54) INFORMATION PROCESSING SYSTEM, INFORMATION PROCESSING METHOD, AND COMPUTER PROGRAM PRODUCT

(71) Applicants: Shunsuke Hayashi, Kanagawa (JP); Takenori Oku, Saitama (JP); Satoshi Mizuno, Tokyo (JP)

(72) Inventors: Shunsuke Hayashi, Kanagawa (JP); Takenori Oku, Saitama (JP); Satoshi Mizuno, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/412,164

(22) Filed: Jan. 23, 2017

(65) Prior Publication Data

US 2017/0230521 A1 Aug. 10, 2017

(30) Foreign Application Priority Data

Feb. 5, 2016 (JP) .................................. 2016-020878

(51) Int. Cl.
*G06F 15/00* (2006.01)
*H04N 1/00* (2006.01)

(52) U.S. Cl.
CPC ..... *H04N 1/00344* (2013.01); *H04N 1/00323* (2013.01); *H04N 1/00832* (2013.01); *H04N 2201/0094* (2013.01)

(58) Field of Classification Search
CPC .......... H04N 1/00344; H04N 1/00832; H04N 1/00323; H04N 2201/0094
USPC .............................................. 358/1.13–1.15
See application file for complete search history.

(56) References Cited

U.S. PATENT DOCUMENTS

| | | | |
|---|---|---|---|
| 2009/0210278 A1 | 8/2009 | Kamisuwa et al. | |
| 2011/0216354 A1* | 9/2011 | Naito ................. | G03G 15/5079 358/1.15 |
| 2014/0320891 A1* | 10/2014 | Kato ....................... | G06F 3/126 358/1.15 |
| 2017/0171400 A1* | 6/2017 | Zakharov ........... | H04N 1/00042 |

FOREIGN PATENT DOCUMENTS

| | | |
|---|---|---|
| JP | 2000-305886 | 11/2000 |
| JP | 2005-332279 | 12/2005 |

OTHER PUBLICATIONS

Extended European Search Report for 17153944.8 dated May 19, 2017.

\* cited by examiner

*Primary Examiner* — Saeid Ebrahimi Dehkordy
(74) *Attorney, Agent, or Firm* — IPUSA, PLLC

(57) ABSTRACT

An information processing system includes a determining unit configured to determine, based on use amounts, for predetermined respective periods, of a device, whether a period during which a use amount of the device increases is present; a deciding unit configured to determine whether maintenance work is to be performed on the device in a case where the determining unit determines that the period during which the use amount of the device increases is present and to decide details of the maintenance work; and an outputting unit configured to output the details of the maintenance work. The deciding unit decides the details of the maintenance work including at least one of a check item name that is in accordance with the device and a replacement component name that is in accordance with a predicted use amount of the device in the period.

12 Claims, 22 Drawing Sheets

FIG.6

| DEVICE ID: A002 | | | | | | | |
|---|---|---|---|---|---|---|---|
| DEVICE ID: A001 | | | | | | | 140 |
| DATE AND TIME | CV | COLOR COUNTER | SHEET FEEDING COUNTER | COVERAGE | NUMBER OF TIMES OF JAM | USE RATE OF COMPONENT A | |
| 2015/6/1 20:30 | ... | ... | ... | ... | ... | ... | |
| 2015/5/31 20:31 | ... | ... | ... | ... | ... | ... | |
| 2015/5/30 20:29 | ... | ... | ... | ... | ... | ... | |

FIG.7

| DEVICE ID | CUSTOMER ID | INSTALLATION LOCATION | MODEL | ... |
|---|---|---|---|---|
| A001 | C001 | ... | ... | ... |
| A002 | C001 | ... | ... | ... |
| A003 | C002 | ... | ... | ... |

| DEVICE ID | BUSY PERIOD |
|---|---|
| A001 | MARCH |
| A002 | MARCH |
| A003 | ABSENCE |
| A004 | MARCH, SEPTEMBER |

| CHECK ID | CHECK NAME | TARGET DATA ITEM NAME | CHECK CONDITION |
|---|---|---|---|
| M001 | ADF CLEANING | NUMBER OF TIMES OF JAM | 1 TIME OR MORE FROM LAST MONTH |
| M002 | SHEET FEEDING ROLLER CLEANING | SHEET FEEDING COUNTER | 500000 SHEETS OR MORE AFTER BEING INSTALLED OR REPLACED |
| M003 | SHEET EJECTING ROLLER CLEANING | COLOR COUNTER | AVERAGE OF LAST MONTH IS 60% OR MORE |
|  |  | COVERAGE | AVERAGE OF LAST MONTH IS 20% OR MORE |

| COMPONENT ID | COMPONENT NAME | TOLERABLE PRINT VOLUME |
|---|---|---|
| P001 | COMPONENT A | 50000 |
| P002 | COMPONENT B | 60000 |
| P003 | COMPONENT C | 2000 |

FIG.12

| DEVICE ID | 2014/1 | 2014/2 | 2014/3 | 2014/4 | ... | 2015/1 | 2015/2 | 2015/3 | 2015/4 | ... |
|---|---|---|---|---|---|---|---|---|---|---|
| A001 | 12100 | 14520 | 36451 | 18420 | ... | 14211 | 16521 | 35420 | 17268 | ... |

200

2014/3 — BUSY PERIOD

PRINT VOLUME IS EXTREMELY LARGER THAN THOSE OF PREVIOUS AND NEXT MONTHS

2015/3 — BUSY PERIOD

FIG.18

| DEVICE ID | CUSTOMER ID | INSTALLATION LOCATION | MODEL | OLD DEVICE ID | ... |
|---|---|---|---|---|---|
| A001 | C001 | ... | ... | ABSENCE | ... |
| A002 | C001 | ... | ... | A101 | ... |
| A003 | C002 | ... | ... | ABSENCE | ... |

| DEVICE ID | 2014/1 | 2014/2 | 2014/3 | 2014/4 | ... | 2015/1 | 2015/2 | 2015/3 | 2015/4 | ... |
|---|---|---|---|---|---|---|---|---|---|---|
| A002 | 8420 | 24110 | 7210 | 7820 | ... | 8211 | 25189 | 8213 | 7213 | ... |

DEVICE IS REPLACED IN APRIL 2014 (DEVICE ID: A101 → A002)

PRINT VOLUMES OF DEVICE ID "A101" — BUSY PERIOD

PRINT VOLUMES OF DEVICE ID "A002" — BUSY PERIOD

| CUSTOMER ID | BUSY PERIOD | DEVICE ID |
|---|---|---|
| C001 | MARCH | A001 |
| | | A002 |
| C002 | ABSENCE | A003 |

US 9,942,421 B2

INFORMATION PROCESSING SYSTEM, INFORMATION PROCESSING METHOD, AND COMPUTER PROGRAM PRODUCT

CROSS-REFERENCE TO RELATED APPLICATIONS

The present application claims priority under 35 U.S.C. § 119 to Japanese Patent Application No. 2016-020878 filed on Feb. 5, 2016, the contents of which are incorporated herein by reference in their entirety.

BACKGROUND OF THE INVENTION

1. Field of the Invention

The disclosures herein generally relate to an information processing system, an information processing method, and a computer program product.

2. Description of the Related Art

A technique, which predicts degree of deterioration of components, degree of consumption of components, and failure periods of components in an image forming apparatus such as a multifunction peripheral, is known in the related art. According to the technique, maintenance work for checking the image forming apparatus and for replacing the components is performed based on the prediction.

For example, Japanese Unexamined Patent Application Publication No. 2000-305886 discloses a technique, which accumulates logging data of an image forming apparatus for each customer and calculates states of components and periods for replacing components to perform accurate timely maintenance.

SUMMARY OF THE INVENTION

It is a general object of at least one embodiment of the present disclosure to provide an information processing system, an information processing method, and a computer program product that substantially obviate one or more problems caused by the limitations and disadvantages of the related art.

According to one aspect of the present disclosure, there is provided an information processing system including at least one information processing apparatus. The information processing system includes a determining unit configured to determine, based on use amounts, for predetermined respective periods, of a device, whether a period during which a use amount of the device increases is present; a deciding unit configured to determine whether maintenance work is to be performed on the device in a case where the determining unit determines that the period during which the use amount of the device increases is present and to decide details of the maintenance work based on a result determined by the deciding unit; and an outputting unit configured to output the details of the maintenance work when the details of the maintenance work for the device are decided by the deciding unit. The deciding unit decides the details of the maintenance work including at least one of a check item name that is in accordance with the device and a replacement component name that is in accordance with a predicted use amount of the device in the period.

BRIEF DESCRIPTION OF THE DRAWINGS

FIG. 6 is a table illustrating an example of device information according to the first embodiment;

FIG. 7 is a table illustrating an example of device management information according to the first embodiment;

FIG. 8 is a table illustrating an example of busy period information according to the first embodiment;

FIG. 9 is a table illustrating an example of check candidate information according to the first embodiment;

FIG. 10 is a table illustrating an example of component information according to the first embodiment;

FIG. 12 is a table illustrating an example of print volume information on print volumes of respective months according to the first embodiment;

FIG. 18 is a table illustrating an example of device management information according to the second embodiment;

FIG. 20 is a table illustrating an example of print volume information on print volumes of respective months according to the second embodiment;

FIG. 22 is a table illustrating an example of busy period information according to the third embodiment;

DESCRIPTION OF THE PREFERRED EMBODIMENTS

In the following, embodiments of the present disclosure will be described with reference to the accompanying drawings. The present disclosure has an object to support maintenance work for a device in consideration of a busy period.

First Embodiment

<System Configuration>

Figure 1:
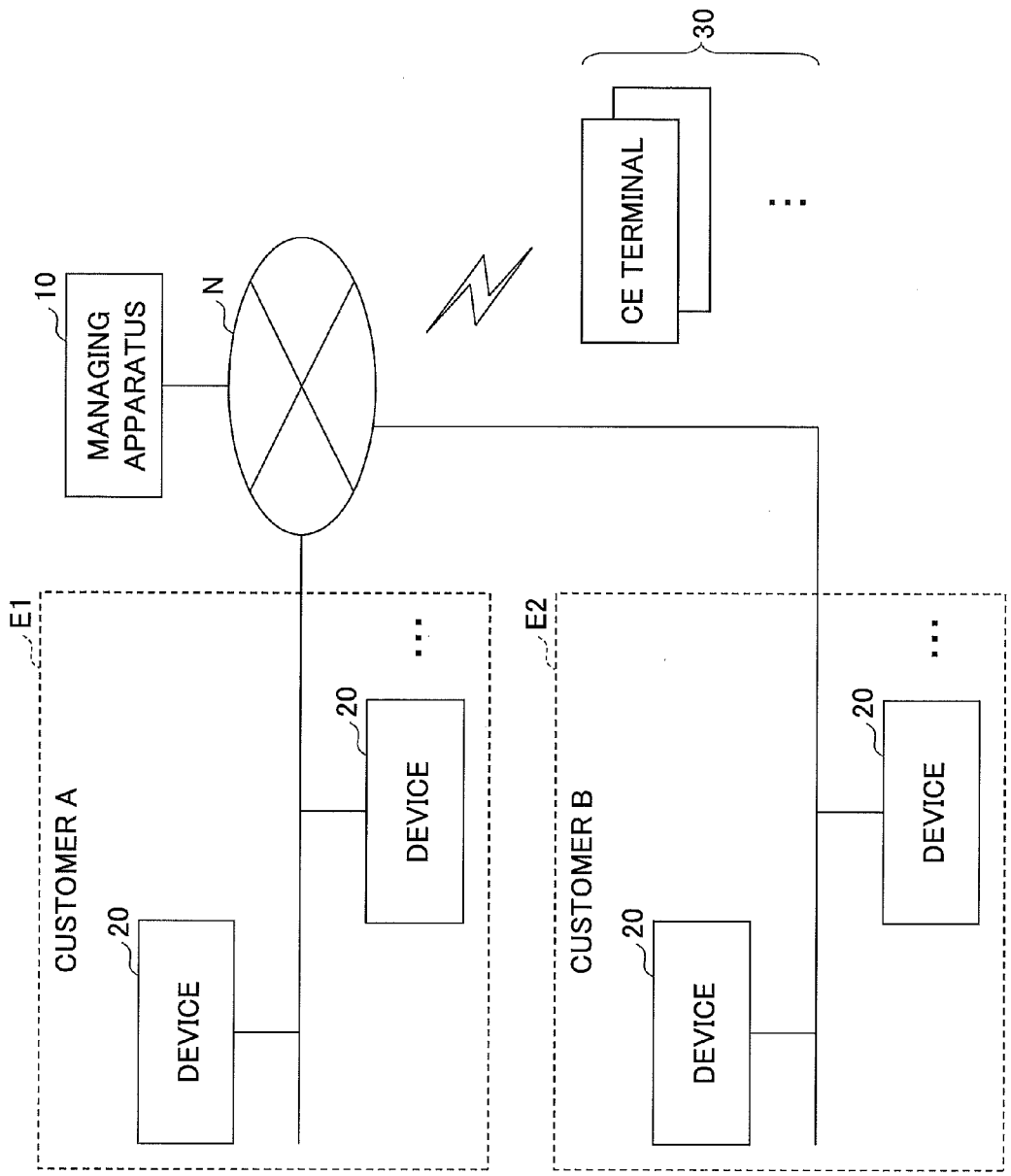
FIG. 1 is a block diagram illustrating an example of a device managing system according to a first embodiment.

A device managing system 1 according to a first embodiment will be described with reference to FIG. 1. FIG. 1 is a block diagram illustrating an example of the device managing system 1 according to the first embodiment.

The device managing system 1 illustrated in FIG. 1 includes a managing apparatus 10, a plurality of devices 20, and a plurality of CE terminals 30 that are coupled with each other in a communicative manner via a network N such as the INTERNET and a telephone network.

The managing apparatus 10 is an information processing apparatus such as a computer that manages the devices 20. The managing apparatus 10 determines a busy period of the device 20. That is, the managing apparatus 10 determines the busy period of operations (business) of a customer who is a user of the device 20. Then, the managing apparatus 10 notifies a workman (serviceman) such as a customer engineer to prompt the workman to perform maintenance work before the busy period. It should be noted that the managing apparatus 10 may determine, for each device 20, whether a device 20 has a busy period in a predetermined period. Some devices 20 may have two or more busy periods in the predetermined period. Some devices 20 may have no busy period. Here, the busy period is a month during which a use amount of the device 20 per month increases in comparison with other months. For example, the use amount of the device 20 (amount used of the device 20) may be a print volume (copy volume: CV). For example, when a print volume of a device 20 in a specific time period is larger by a predetermined volume than an average of print volumes of the device 20, the managing apparatus 10 may determine that the specific time period is a busy period. A month, during which a use amount of the device 20 is increased in accordance with a business category of a customer, may be the busy period. For example, March, which is a settlement period, and/or December, which is the end of the year, may be the busy period.

Figure 2:
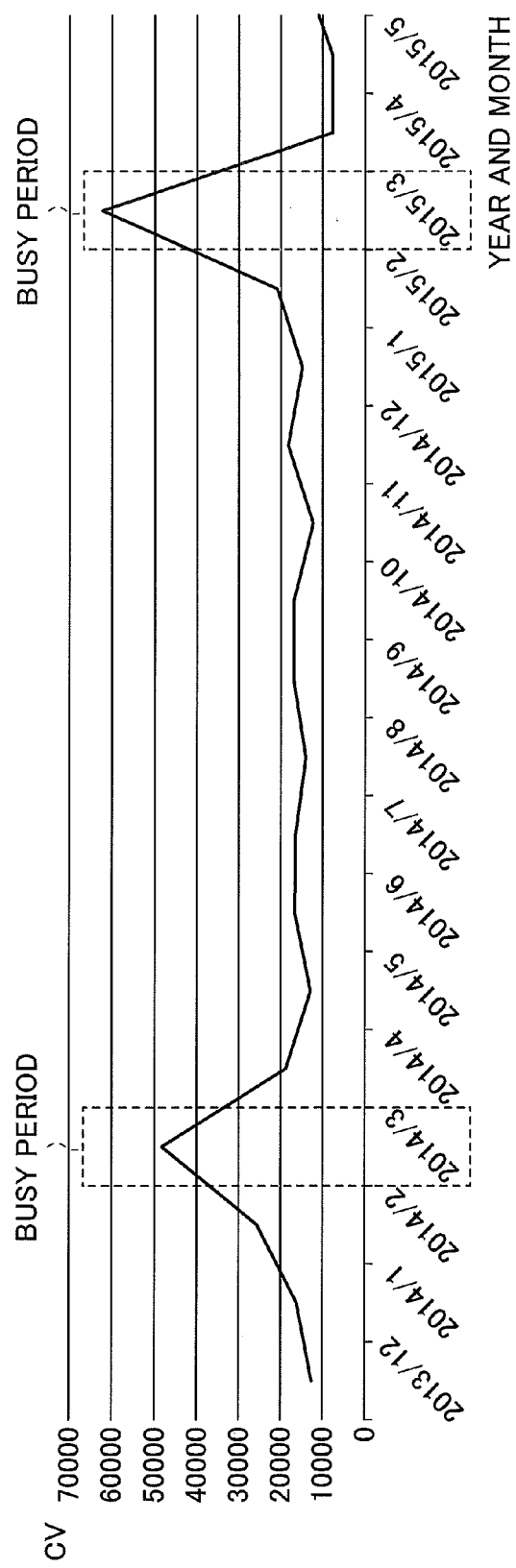
FIG. 2 is a graph illustrating an example that depicts a busy period according to the first embodiment.

For example, in a graph that represents a print volume (CV) of the device 20 per month as illustrated in FIG. 2, a print volume (CV) of "March, 2014" and, a print volume (CV) of "March, 2015" particularly increase in comparison with print volumes (CVs) of other months. In such a case, the busy period of the device 20 is "March".

In the following descriptions, the use amount of the device 20 is the print volume (copy volume), which represents the number of printing sheets. However, the use amount is not limited to the print volume. For example, the number of documents scanned by a scanner, a length of an activation time, the number of times of temperature elevation of a fixing member, or a length of a time, during which the fixing member is heated over a temperature exceeding a predetermined threshold, may be the use amount.

The managing apparatus 10 decides, based on at least one of a way of using the device 20, a predicted print volume (predicted Copy Volume) in the busy period, and the like, details of maintenance work (maintenance details). Here, the maintenance details are one or more components to be replaced (replacement components) and one or more items to be checked (inspected) in the device 20 (check items).

In this way, after deciding one or more check items and/or one or more replacement components of the device 20 based on at least one of a way of using a device 20, a predicted print volume (predicted Copy Volume) in a busy period, and the like, the managing apparatus 10 according to the first embodiment notifies a workman of the decided details of maintenance for the device 20 to prompt the workman to perform maintenance work before the busy period. It should be noted that the managing apparatus 10 may determine, for each device 20, details of maintenance for a device 20.

Thus, the device managing system 1 according to the first embodiment can prevent the device 20 from being repaired in the busy period of the customer and prevent the components of the device 20 being replaced in the busy period of the customer. In other words, the device managing system 1 according to the first embodiment can reduce down-time of the device 20 in the busy period of the customer.

Although one information processing apparatus constitutes the managing apparatus 10 illustrated in FIG. 1, the present disclosure is not limited to this. A plurality of information processing apparatuses may constitute the managing apparatus 10. In other words, the device managing system 1, which is an example of an information processing system, may include at least one information processing apparatus.

The devices 20 are image forming apparatuses such as a printer and a multifunction peripheral placed in a customer environment E1, which represents a business facility or the like of a customer A who is a user, and in a customer environment B, which represents a business facility or the like of a customer B.

In the descriptions of the embodiments, the devices 20 are image forming apparatuses such as multifunction peripherals. However, the devices 20 are not limited to the image forming apparatuses. For example, the devices 20 may be various electronic devices or apparatuses such as a projector, an electronic black board, a teleconferencing (video-conference) terminal, a digital signage apparatus, a camera, a machine tool, and a register.

In a case where the device 20 is a projector, the use amount may be a length of a projection time, or a length of an activation time, for example. In a case where the device 20 is an electronic blackboard, the use amount may be a length of a display time, a length of an activation time, or the number of times of being operated by an electronic pen, for example. In a case where the device 20 is a teleconferencing terminal, the use amount may be a length of a call time, or a length of an activation time, for example. In a case where the device 20 is a camera, the use amount may be the number of pictures (photographed images), or a length of an activation time, for example. In a case where the device 20 is a machine tool, the use amount may be a length of a machining time, or a length of an activation time, for example.

The CE terminals 30 are various information processing apparatuses (electronic apparatuses) such as a desktop PC, a notebook PC, a tablet terminal, and a smartphone. A workman such as a customer engineer (CE) who performs maintenance work on the device 20 uses the CE terminal 30. For example, the customer engineer checks (inspects) the device 20 and replaces one or more components of the device 20. The workman can perform maintenance work on the device 20 based on the maintenance details reported from the managing apparatus 10 to the CE terminal 30.

<Hardware Configuration>

Figure 3:
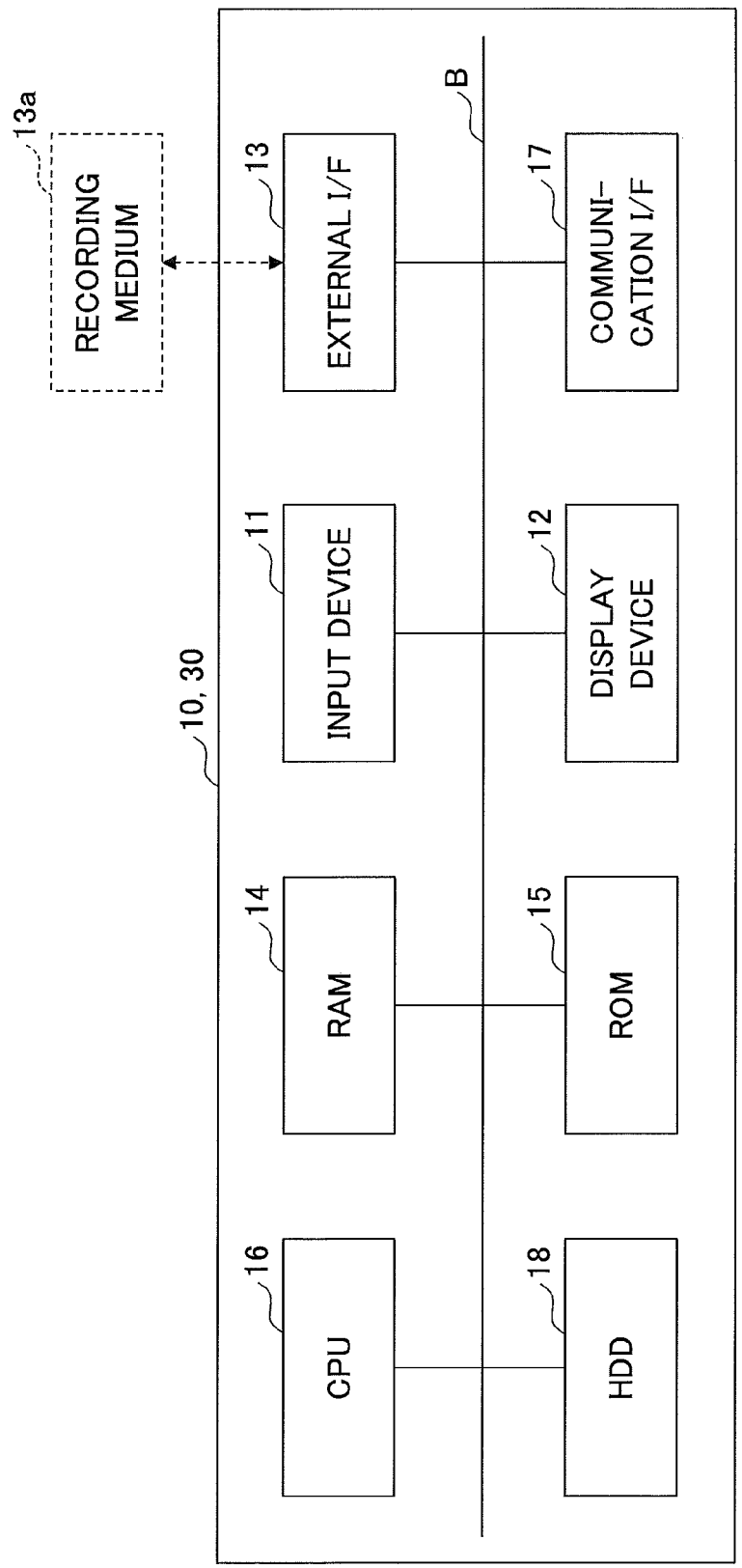
FIG. 3 is a block diagram illustrating an example of a hardware configuration of a managing apparatus and a terminal according to the first embodiment.

A hardware configuration of the managing apparatus 10 and the CE terminal 30 according to the first embodiment will be described with reference to FIG. 3. FIG. 3 is a block diagram illustrating an example of the hardware configuration of the managing apparatus 10 and the CE terminal 30 according to the first embodiment. Because the managing apparatus 10 and the CE terminal 30 have the similar hardware configuration, the hardware configuration of the managing apparatus 10 will be mainly described here.

The managing apparatus 10 illustrated in FIG. 3 includes an input device 11, a display device 12, an external I/F 13, and a Random Access Memory (RAM) 14. Further, the managing apparatus 10 includes a Read Only Memory (ROM) 15, a Central Processing Unit (CPU) 16, a communication I/F 17, and a Hard Disk Drive (HDD) 18. These hardware elements are coupled with each other via a bus B.

The input device 11 includes a keyboard, mouse, a touch panel, and the like. The user can use the input device 11 to input various operation signals. The display device 12 includes a display and the like to display a processing result. Here, the managing apparatus 10 may have a configuration in which at least one of the input device 11 and the display device 12 is coupled to the bus B to use only when the at least one of the input device 11 and the display device 12 is necessary.

The external I/F 13 is an interface with an external apparatus. The external apparatus may be a recording medium 13a such as a Compact Disk (CD), a Digital Versatile Disk (DVD), a SD memory card, or Universal Serial Bus (USB) memory. The managing apparatus 10 can read information (data) from the recording medium 13a and write information (data) on the recording medium 13a through the external I/F 13.

The RAM 14 is a volatile semiconductor memory (storage device) that temporarily holds (stores) programs and/or data. The ROM 15 is a non-volatile semiconductor memory (storage device) that can hold (store) programs and/or data even when a power source is powered off. The CPU 16 is an arithmetic device that reads, from the ROM 15 and the HDD 18, for example, the program(s) and/or the data onto the RAM 14 to execute various kinds of processing.

The communication I/F 17 is an interface that couples the managing apparatus 10 to the network N. The HDD 18 is a non-volatile memory (storage device) that stores programs and data.

The programs and data stored in the HDD 18 may include at least one program that actualizes the embodiment, an operating system (OS), which is basic software for controlling the entire managing apparatus 10, various application programs that provides various functions in the OS, and so on. The managing apparatus 10 may use a non-volatile memory (storage device) such as a Solid State Drive (SSD) instead of the HDD 18 or additionally to the HDD 18.

The managing apparatus 10 and the CE terminal 30 according to the first embodiment have the hardware configuration illustrated in FIG. 3 to actualize, various kinds of processing, which will be described below.

Figure 4:
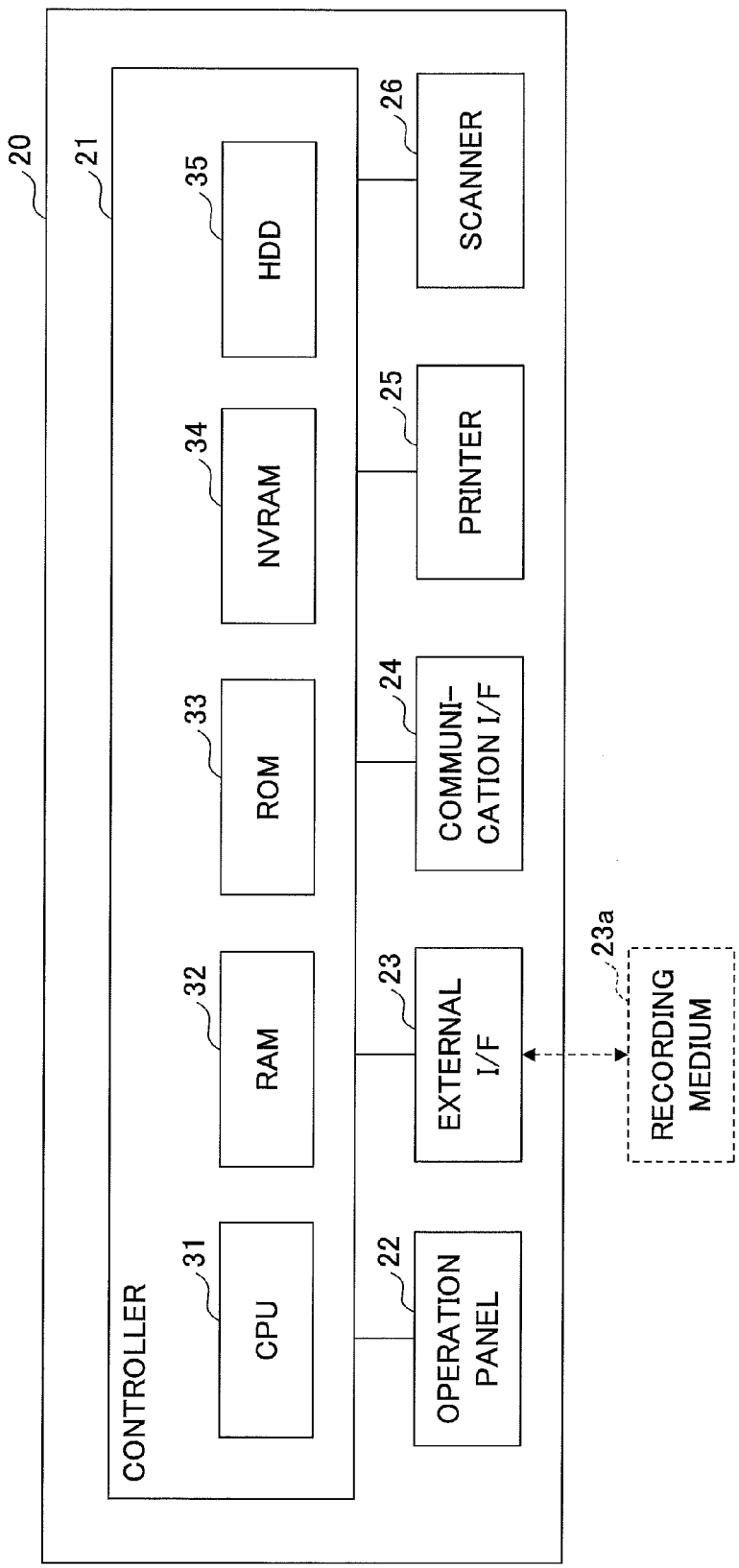
FIG. 4 is a block diagram illustrating an example of a hardware configuration of a device according to the first embodiment.

A hardware configuration of the device 20 according to the first embodiment will be described with reference to FIG. 4. FIG. 4 is a block diagram illustrating an example of a hardware configuration of the device 20 according to the first embodiment.

The device 20 illustrated in FIG. 4 includes a controller 21, an operation panel 22, an external I/F 23, a communication I/F 24, a printer 25, and a scanner 26.

Further, the controller 21 includes a CPU 31, a RAM 32, a ROM 33, a NVRAM 34, and a HDD 35.

The ROM 33 is a non-volatile semiconductor memory (storage device) that stores various programs and/or data. The RAM 32 is a non-volatile semiconductor memory (storage device) that temporarily holds (stores) programs and/or data. The NVRAM 34 stores setting information (setup information) and the like, for example. The HDD 35 is a non-volatile memory (storage device) that stores various programs and/or data.

The CPU 31 reads the program(s), the data, the setting information, or the like onto the RAM 32 from the ROM 33, the NVRAM 34, the HDD 35, or the like to execute the processing. Thereby, the CPU 31 actualizes control and functions of the entire device 20.

The operation panel 22 includes an input unit that receives input from a user and a display unit that displays data, an image, and/or the like. The external I/F 23 is an interface with an external device. A recording medium 23a or the like may be the external device. The device 20 can read and write information (data) from and on the recording medium 23a through the external I/F 23. An IC card, a flexible disk, a CD, a DVD, an SD memory card, a USB memory or the like may be the recording medium 23a.

The communication I/F 24 is an interface that couples the device 20 to the network N. The device 20 can perform data communication through the communication I/F 24. The printer 25 is a printing device that prints print data on a sheet (paper). The scanner 26 is a reading device that reads one or more documents to generate image data (electronic data).

The device 20 according to the first embodiment has the hardware configuration illustrated in FIG. 4 to actualize, various kinds of processing, which will be described below.

<Functional Configuration>

Figure 5:
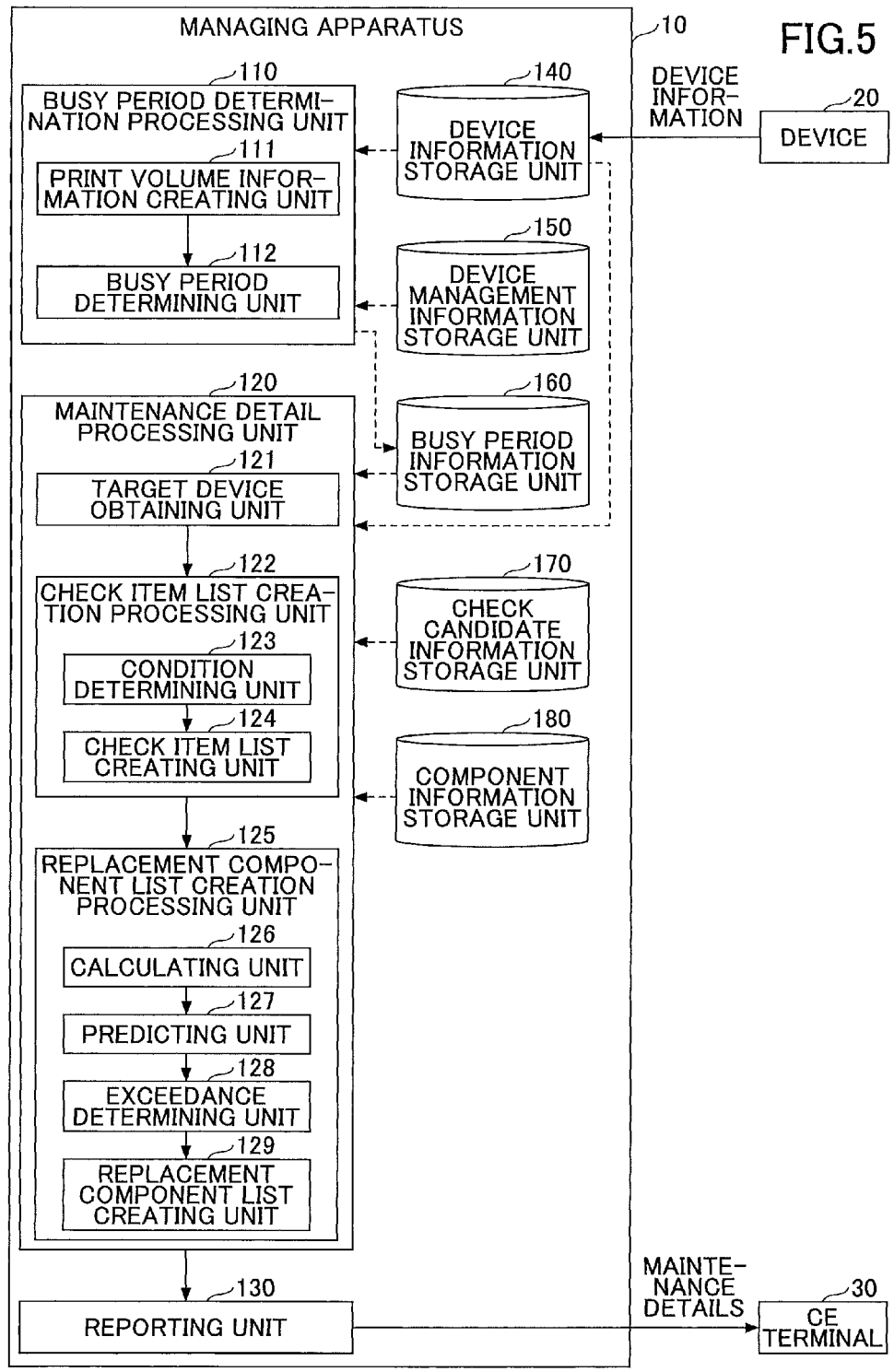
FIG. 5 is a block diagram illustrating an example of a functional configuration of the managing apparatus according to the first embodiment.

A functional configuration of the managing apparatus 10 according to the first embodiment will be described with reference to FIG. 5. FIG. 5 is a block diagram illustrating an example of the functional configuration of the managing apparatus 10 according to the first embodiment.

The managing apparatus 10 illustrated in FIG. 5 includes a busy period determination processing unit 110, a maintenance detail processing unit 120, and a reporting unit 130. These functional units (elements) are actualized by processing that one or more programs, installed in the managing apparatus 10, cause the CPU 16 to execute.

Further, the managing apparatus 10 includes a device information storage unit 140, a device management information storage unit 150, a busy period information storage unit 160, and a check candidate information storage unit 170, and a component information storage unit 180. These storage units may be actualized by using the HDD 18. At least one storage unit of these storage units may be actualized by a storage device or the like coupled to the managing apparatus 10 via the network N.

The busy period determination processing unit 110 performs processing to determine a busy period for each device ID stored in the device management information storage unit 150. Here, the busy period determination processing unit 110 includes a print volume information creating unit 111 and a busy period determining unit 112. A device ID is identification information for uniquely identifying the device 20. For example, the device ID may be an inherent product number, a serial number, or the like.

Based on the device information stored in the device information storage unit 140, the print volume information creating unit 111 calculates print volumes (copy volumes) for respective months of the device 20 and creates print volume information on the print volumes for the respective months.

The busy period determining unit 112 determines one or more busy periods of the device 20 based on the print volume information, created by the print volume information creating unit 111, for the respective months. Then, the busy period determining unit 112 creates busy period information, which associates the device ID of the device 20 with the determined busy period, and stores the created busy period information in the busy period information storage unit 160. It should be noted that the busy period determining unit 112 may determine, for each device 20, whether a month (period) during which a use amount of the device 20 increases is present based on print volumes (use amounts) for respective months (predetermined respective periods) of the device 20.

The maintenance detail processing unit 120 specifies a device 20 to be maintained (maintenance target device 20) and performs processing to create lists that are a check item list and a replacement component list. The lists represent maintenance details of the specified device 20. Here, the maintenance detail processing unit 120 includes a target device obtaining unit 121, a check item list creation processing unit 122, and a replacement component list creation processing unit 125.

The target device obtaining unit 121 obtains device IDs of devices 20, on which maintenance work is to be performed, with reference to the busy period information storage unit 160. That is, the target device obtaining unit 121 specifies devices 20, of which busy periods are near, as targets on which maintenance work is to be performed, and obtains the device IDs of the specified devices 20 from the busy period information storage unit 160. For example, the target device obtaining unit 121 specifies the devices 20 of which busy periods are two month after. It should be noted that the number of devices 20 of which busy periods are near may be 0, 1, or 2 or more.

The check item list creation processing unit 122 performs processing of creating a check item list for each of the devices 20 on which maintenance work is to be performed. Here, the check item list creation processing unit 122 includes a condition determining unit 123 and a check item list creating unit 124.

The condition determining unit 123 determines whether a device 20 satisfies a check condition included in check candidate information stored in the check candidate information storage unit 170. The condition determining unit 123 determines whether the check condition is satisfied based on the device information on the device 20. In a case where the condition determining unit 123 determines that the device 20 satisfies the check condition, the check item list creating unit 124 adds, to the check item list, a check item name corresponding to the check condition. In other words, the check item list creation processing unit 122 may determine whether maintenance work is to be performed on a device 20 based on a check condition, which represents a condition of a case of requiring a predetermined check, and device information, which represents operating status of the device 20. When the device information satisfies the check condition, the check item list creation processing unit 122 may decide details of the maintenance work including the check item name corresponding to the predetermined check.

The replacement component list creation processing unit 125 performs processing of creating a replacement component list for each of the devices 20 on which maintenance work is to be performed. Here, the replacement component list creation processing unit 125 includes a calculating unit 126, a predicting unit 127, an exceedance determining unit 128, and a replacement component list creating unit 129.

The calculating unit 126 calculates, for each component included in the device 20, a remaining print volume printable by the component based on device information on the device 20 and component information stored in the component information storage unit 180. The predicting unit 127 calculates a predicted copy volume of the device 20 in a busy period. In other words, the predicting unit 127 may predict the future volume (future number of sheets to be printed) to be printed in the busy period.

The exceedance determining unit 128 determines whether the predicted copy volume predicted by the predicting unit 127 exceeds the remaining print volume of the component. In a case where the exceedance determining unit 128 determines that the predicted copy volume exceeds the remaining print volume, the replacement component list creating unit 129 adds the component to the replacement component list. In other words, the replacement component list creation processing unit 125 may determine, for each component included in a device 20, whether maintenance work is to be performed on the device 20 based on a maximum use amount of a component and a predicted use amount of the device 20 in the busy period. When the predicted use amount exceeds the maximum use amount, the replacement component list creation processing unit 125 may decide details of the maintenance work including the replacement component name corresponding to the component such that the component is to be replaced.

In other words, the maintenance detail processing unit 120 may determine, for each device 20, whether maintenance work is to be performed on the device 20 when the busy period determination processing unit 110 determines that the period during which the use amount (print volume) of the device 20 increases is present. Then, the maintenance detail processing unit 120 may decide, for each of the devices 20 that have the periods during which the use amount increases, details of the maintenance work based on a result determined by the maintenance detail processing unit 120.

It should be noted that the maintenance detail processing unit 120 may decide, for each device 20 on which maintenance work is to be performed, details of maintenance work including at least one of a check item name that is in accordance with the device 20 and a replacement component name that is in accordance with a predicted use amount (predicted print volume) of the device 20 in the busy period. The check item name may be a name of a check for the device 20, and the replacement component list may be a list of one or more components, of the device 20, to be replaced.

The reporting unit 130 notifies the CE terminal 30 of the check item list, created by the check item list creation processing unit 122, and the replacement component list, created by the replacement component list creation processing unit 125, as maintenance details. In other words, when the details of the maintenance work for the device 20 are decided by maintenance detail processing unit 120, the reporting unit 130 may output (report) the details of the maintenance work to the CE terminal 30 that a workman, who performs the maintenance work on the device 20, uses.

The device information storage unit 140 stores device information. Here, the device information stored in the device information storage unit 140 will be described with reference to FIG. 6. FIG. 6 is a table illustrating an example of the device information.

As illustrated in FIG. 6, the device information storage unit 140 stores the device information for each device ID. The device information is information that represents various states of the device 20 such as an operating state and a use state. For example, a date and time, at which the device 20 has transmitted the device information to the managing apparatus 10, is associated with a print volume (CV) at the date and time, a color counter at the date and time, a sheet feeding counter at the date and time, a coverage at the date and time, a number of times of JAM (paper jam), a use rate of a component A at the date and time, and the like.

That is, values of various counters of the device 20, values of various sensors of the device 20, and the like are managed in time series for each of the devices 20 in the device information storage unit 140. For example, the device information is daily transmitted to the managing apparatus from the device 20 and accumulated (stored) in the device information storage unit 140. In other words, the device information may be updated in the device information storage unit 140 every time the device information is transmitted from the device 20. It should be noted that each of the devices 20 transmits its device information to the managing apparatus 10.

The device management information storage unit 150 stores device management information. Here, the device management information stored in the device management information storage unit 150 will be described with reference to FIG. 7. FIG. 7 is a table illustrating an example of the device management information.

As illustrated in FIG. 7, in the device management information, respective device IDs (A001 to A003) are associated with customer IDs (C001 to C003), which are identification information items for uniquely identifying customers of the devices 20 of the device IDs, and installation places of the devices 20, models (types) of the devices 20, and the like. That is, for each of the devices 20 included in the device managing system 1, information on a model, an installation place, and a customer of the device 20 is managed in the device management information storage unit 150.

The busy period information storage unit 160 stores busy period information. Here, the busy period information stored in the busy period information storage unit 160 will be described with reference to FIG. 8. FIG. 8 is a table illustrating an example of the busy period information.

As illustrated in FIG. 8, in the busy period information, respective device IDs (A001 to A004) are associated with busy periods. That is, for each of the devices 20, a busy period of the device 20 is managed in the busy period information storage unit 160. In a case where a device 20 does not have a busy period, "ABSENCE" is associated with the device ID of the device 20, for example. In a case where the device 20 has a plurality of busy periods such as "MARCH" and "SEPTEMBER", "MARCH AND SEPTEMBER" are associated with the device ID of the device 20, for example.

The check candidate information storage unit 170 stores check candidate information. Here, the check candidate information stored in the check candidate information storage unit 170 will be described with reference to FIG. 9. FIG. 9 is a table illustrating an example of the check candidate information.

As illustrated in FIG. 9, in the check candidate information, respective check IDs (M001 to M003), which are identification items for uniquely identifying check items, are associated with check item names, target data item names, and check conditions. Here, the target data item names are data item names, among the data items (for example, print volume, color counter, sheet feeding counter, coverage, number of times of JAM, and use rate of component A) included in the device information stored in the device information storage unit 140, that are subjected to condition determination of the check conditions.

That is, in the check candidate information storage unit 170, candidates of check items of the device 20 and conditions (target data items and check conditions) in a case of requiring checks by the check conditions are managed. For example, when the number of times of paper jam is 1 or more times from the last month, the check condition corresponding to the check ID M001 is satisfied. Then, maintenance work for cleaning an auto document feeder (ADF) of the device 20 is to be requested and performed.

The component information storage unit 180 stores component information. Here, the component information stored in the component information storage unit 180 will be described with reference to FIG. 10. FIG. 10 is a table illustrating an example of the component information.

As illustrated in FIG. 10, in the component information, respective components IDs (P001 to P003), which are identification information items for uniquely identifying components included in the device 20, are associated with component names, and tolerable print volumes. Here, the tolerable print volume is a print volume until reaching which the component operates without failure. In other words, when printing is performed to exceed a tolerable print volume in a component, the component fails or a possibility of failure becomes higher.

That is, in the component information storage unit 180, a component name, a tolerable print volume, and the like are managed for each of the components included the device 20.

<Details of Processing>

Details of processing of the device managing system 1 according to the first embodiment will be described.

Figure 11:
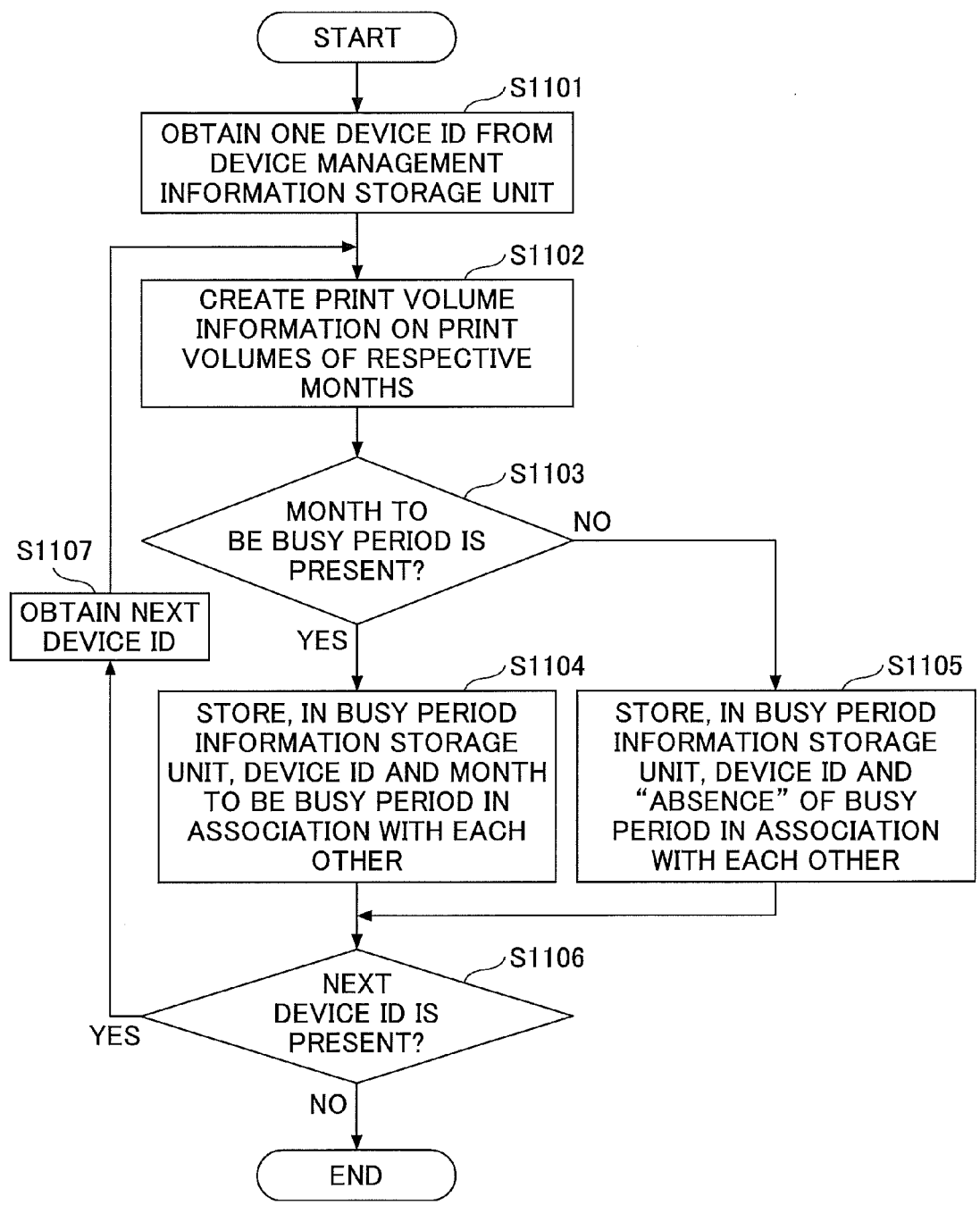
FIG. 11 is a flowchart illustrating an example of processing of determining the busy period according to the first embodiment.

Processing of determining, for each of the devices 20, a busy period of a device 20 and creating busy period information in the managing apparatus 10 will be described with reference to FIG. 11. FIG. 11 is a flowchart illustrating an example of processing of determining the busy period according to the first embodiment. For example, the processing of determining the busy period illustrated in FIG. 11 is executed daily, weekly, monthly, or the like.

First, the busy period determination processing unit 110 obtains one device ID from the device management information stored in the device management information storage unit 150 in step S110.

Next, in step S1102, the busy period determination processing unit 110 causes the print volume information creating unit 111 to create print volume information, which represents print volumes for respective months of the device 20 represented by the obtained device ID. That is, the print volume information creating unit 111 obtains device information of the device ID from the device information storage unit 140 to create, from the print volumes included in the device information, the print volume information on the print volumes of the respective months.

Here, FIG. 12 illustrates print volume information 200 that represents, for the respective months, print volumes of the device 20 of which the device ID "A001". As illustrated in FIG. 12, the print volume information 200 is information that represents the print volumes of the respective months in a predetermined time period, such as one or more years, in the device 20, for example.

Next, the busy period determination processing unit 110 causes the busy period determining unit 112 to determine whether a month to be a busy period is present in step S1103. That is, for example, the busy period determining unit 112 determines, based on the print volume information on the print volumes of the respective months, whether a month whose print volume is larger by a predetermined value than those of other months is present. Alternatively, the busy period determining unit 112 may determine whether a month whose print volume is larger by a predetermined ratio (predetermined proportion) than those of other months is present.

For example, in the print volume information 200 on the print volumes in the respective months illustrated in FIG. 12, the busy period determining unit 112 determines that "March" is present as the month to be the busy period.

The busy period determining unit 112 may further determine whether there is a periodicity (yearly cyclic nature) in a month of which the print volume is larger by the predetermined value (or the predetermined ratio) than other months. In this way, for example, in a case where a print volume in a specific month is increased due to temporal busyness of the business of the customer, it becomes possible not to determine that the specific month, in which the print volume is larger, is the busy period.

In a case of determining that the month to be the busy period is present (YES in step S1103), the busy period determining unit 112 creates busy period information that associates the device ID with the month to be the busy period. Then, the busy period determining unit 112 stores the created busy period information in the busy period information storage unit 160 in step S1104. In this way, the busy period of the device 20 is managed in the busy period information storage unit 160.

In a case of determining in step S1103 that a plurality of months to be busy periods are present, the busy period determining unit 112 may create busy period information that associates the device ID with the plurality of months to be the busy periods such as "MARCH" and "SEPTEMBER", for example.

On the other hand, in a case of determining that there is no month to be the busy period (NO in step S1103), the busy period determining unit 112 creates busy period information that associates the device ID with "ABSENCE", which indicates that there is no month to be the busy period. Then, the busy period determining unit 112 stores the created busy period information in the busy period information storage unit 160 in step S1105.

Although the busy period information for the device 20 having no busy period is created to store the created busy period information in the busy period information storage unit 160 according to the first embodiment, the present disclosure is not limited to this. When a device 20 does not have a busy period, it is not necessary to create busy period information for the device 20, for example.

Next, the busy period determination processing unit 110 determines whether device management information including a next device ID is stored in the device management information storage unit 150 in step S1106. That is, the busy period determination processing unit 110 determines whether there is a device ID, which has not been obtained yet.

In a case of determining that the device management information including the next device ID is stored in the device management information storage unit 150 (YES in step S1106), the busy period determination processing unit 110 obtains the next device ID in step S1107, and the processing returns to step S1102. In this way, the busy period determination processing unit 110 executes the processes of steps S1102 to S1106 for each of the device IDs managed in the device management information storage unit 150.

On the other hand, in a case of determining that the device management information including the next device ID is not stored in the device management information storage unit 150 (NO in step S1106), the busy period determination processing unit 110 finishes the processing.

As described above, according to the device managing system 1 of the first embodiment, the busy periods of the respective devices 20 are managed in the managing apparatus 10.

In the processing of determining the busy period illustrated in FIG. 11, for each of the devices 20, the busy period of the device 20 is determined after creating the print volume information on the print volumes in the respective months. However, the present disclosure is not limited to this. For example, for each of the devices 20, the busy period of the device 20 may be determined after creating print volume information on print volumes of respective quarters. In this way, a quarter ("April to June", "July to September", "October to December", or "January to March") to be busy may be determined for each of the devices 20.

Thus, in the processing of determining the busy period as illustrated in FIG. 11, the print volume information to be created is not limited to the print volume information on the print volumes in the respective months. Print volume information on a print volume for each predetermined period such as print volume information on a print volume for each quarter, print volume information on a print volume for each two months, or print volume information on a print volume for each week may be created to determine a busy period based on the created the print volume information on the print volume for each predetermined period.

Figure 13:
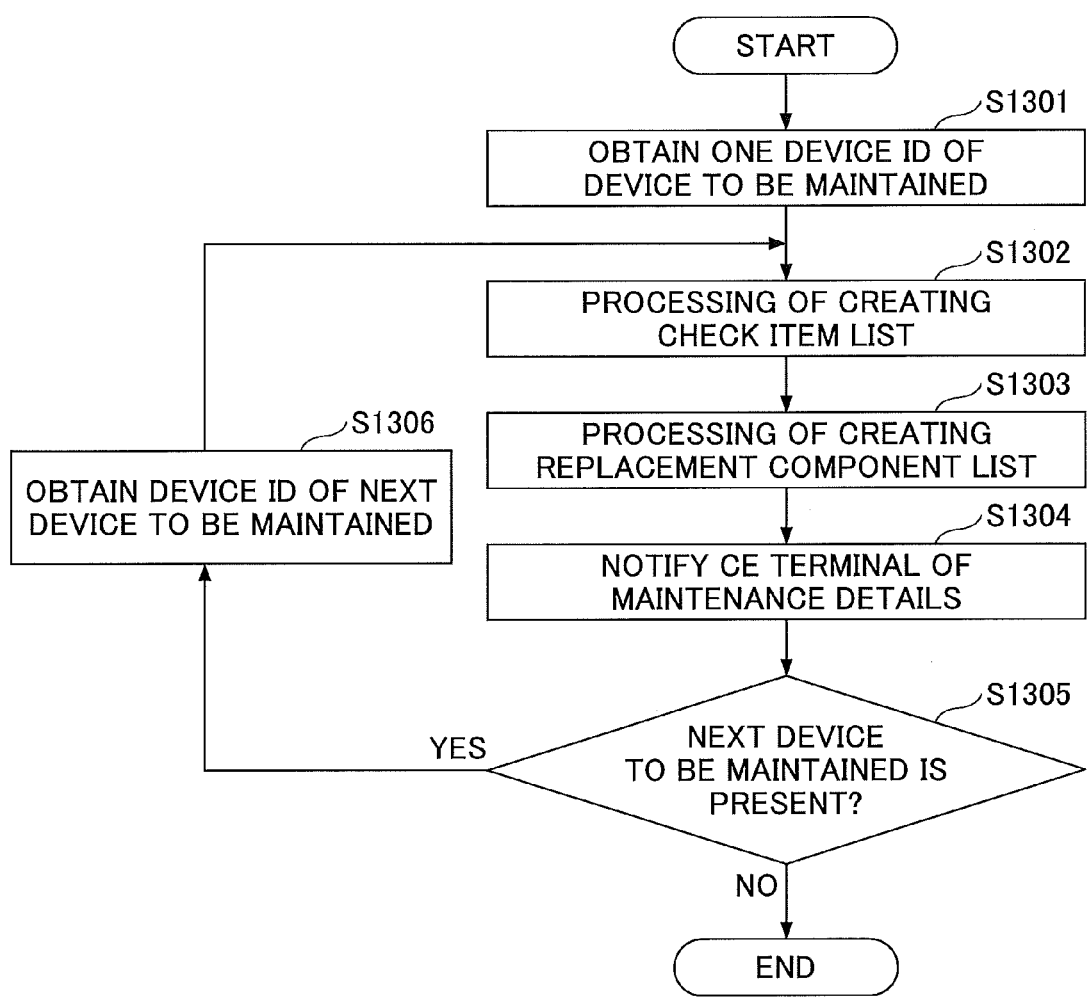
FIG. 13 is a flowchart illustrating an example of processing of reporting maintenance details according to the first embodiment.

Next, processing of notifying, after specifying devices 20 (which are devices 20 of which busy periods are near) to be maintained and creating lists that represent maintenance details for the specified devices 20, the CE terminal 30 of the maintenance details will be described with reference to FIG. 13. FIG. 13 is a flowchart illustrating an example of processing of reporting maintenance details according to the first embodiment. For example, the processing of reporting the maintenance details illustrated in FIG. 13 is executed daily, weekly, or the like.

First, the maintenance detail processing unit 120 causes the target device obtaining unit 121 to obtain a device ID of the device 20, on which maintenance work is to be performed, from the busy period information storage unit 160 in step S1301.

That is, the target device obtaining unit 121 specifies, from among a plurality of devices 20 of the busy period information stored in the busy period information storage unit 160, the device 20 of which a busy period is near. For example, the target device obtaining unit 121 specifies a device 20 of which the busy period is two months after. Then, the target device obtaining unit 121 obtains the one specified device ID from the busy period information.

Next, the maintenance detail processing unit 120 causes the check item list creation processing unit 122 to perform processing of creating a check item list that represents a list of check items with respect to the device 20 of the obtained device ID in step S1302. Details of the processing of creating the check item list will be described below.

Next, the maintenance detail processing unit 120 causes the replacement component list creation processing unit 125 to perform processing of creating a replacement component list that represents a list of replacement components with respect to the device 20 of the obtained device ID in step S1303. Details of the processing of creating the replacement component list will be described below.

Next, the reporting unit 130 notifies the CE terminal 30 of the created check item list and the created replacement component list as maintenance details and requests maintenance work in step S1304.

Figure 14:
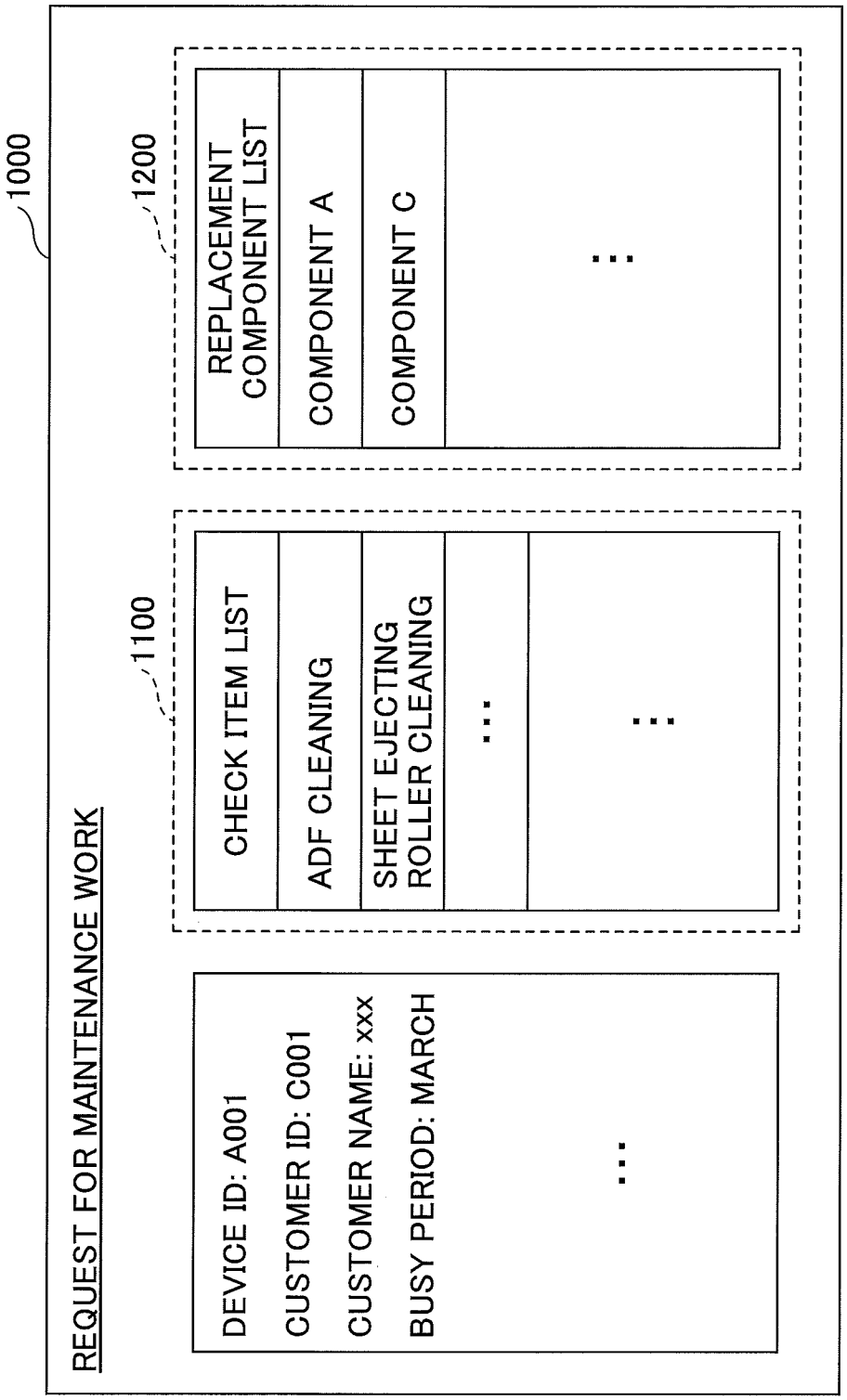
FIG. 14 is a diagram illustrating an example of a screen of reporting the maintenance details according to the first embodiment.

Here, when the maintenance details are reported by the reporting unit 130, a request screen 1000 of the maintenance work is displayed on the CE terminal 30 as illustrated in FIG. 14, for example.

In the request screen 1000 of the maintenance work illustrated in FIG. 14, a check item list 1100 and a replacement component list 1200 with respect to the device 20, of which the device ID is "A001", to be maintained are displayed. In this way, in the request screen 1000 of the maintenance work illustrated in FIG. 14, a list of appropriate check items (check item list 1100) and a list of appropriate replacement components (replacement component list 1200) with respect to the device 20 to be maintained are displayed.

In this way, according to the device managing system 1 of the first embodiment, a workman such as a customer engineer can check the device 20 and replace the components of the device 20 appropriately before the busy period of the device 20 to be maintained. Thus, according to the device managing system 1 of the first embodiment, for example, it is possible to prevent the device 20 from being repaired in the busy period and prevent the components of the device 20 being replaced in the busy period.

For example, the reporting unit 130 may transmit the check item list and the replacement component list to the CE terminal 30 by email or the like to notify the CE terminal 30.

However, the present disclosure is not limited to this. The reporting unit 130 may notify the workman of the maintenance details by various methods. For example, the reporting unit 130 may display the maintenance details on a Web page that the workman accesses via the CE terminal 30 or may transmit the maintenance details by facsimile (FAX). The reporting unit 130 may print out the maintenance details to transmit the printed sheet so as to notify the workman, for example.

Next, in step S1305, the maintenance detail processing unit 120 causes the target device obtaining unit 121 to determine whether a next device ID, which has not been obtained yet, is included in the busy period information. That is, the target device obtaining unit 121 determines whether there is a next device ID of which the busy period is near.

In a case of determining that the next device ID is included in the busy period information (YES in step S1305), the target device obtaining unit 121 obtains the next device ID in step S1306, and the processing returns to step S1302. In this way, the maintenance detail processing unit 120 executes the processes of steps S1303 to S1305 with respect to each of the device IDs of the devices 20 of which busy periods are near among the device IDs included in the busy period information managed in the busy period information storage unit 160. It should be noted that the target device obtaining unit 121 may specify in step S1301 a plurality of devices 20 to be maintained, and may determine in step S1305 whether a next device ID, which has not been obtained yet, is included in the device IDs of the devices 20 specified in step S1301.

On the other hand, in a case of determining that the next device ID is not present in the busy period information (NO in step S1305), the maintenance detail processing unit 120 finishes the processing.

As described above, according to the device managing system 1 of the first embodiment, for each of the devices 20 of which the busy periods are near, the appropriate check item list and the appropriate replacement component list are created as the details of the maintenance work with respect to the device 20 to request the workman to perform the maintenance work. In this way, according to the device managing system 1 of the first embodiment, it is possible, before the busy period of the device 20, to check the device 20 and replace the components of the device 20 appropriately based on the way of using the device 20, the predicted print volume in the busy period, and the like.

Figure 15:
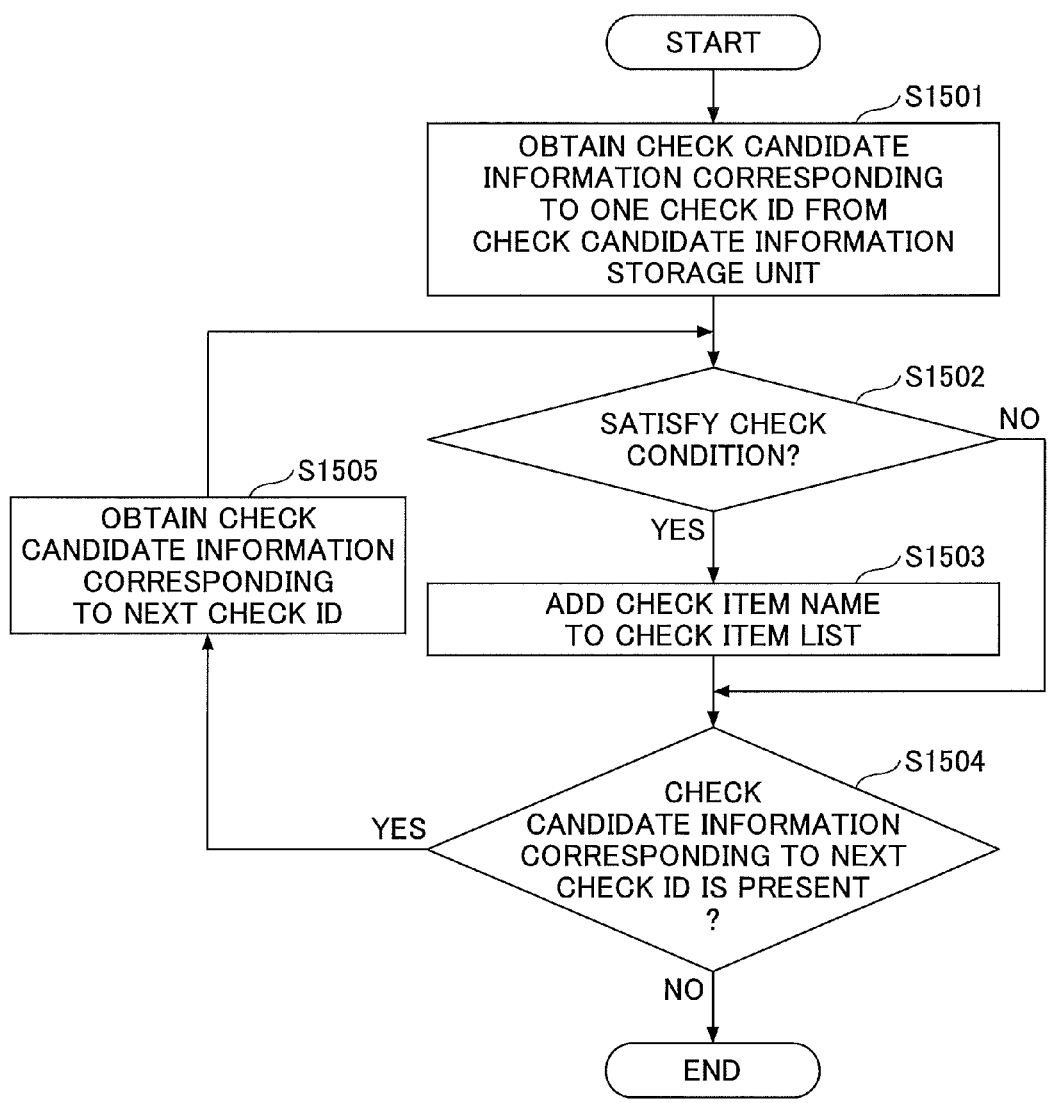
FIG. 15 is a flowchart illustrating an example of processing of creating a check item list according to the first embodiment.

The processing of creating the check item list in step S1302 of FIG. 13 will be described with reference to FIG. 15. FIG. 15 is a flowchart illustrating an example of the processing of creating the check item list according to the first embodiment.

First, the check item list creation processing unit 122 obtains check candidate information corresponding to one check ID from the check candidate information storage unit 170 in step S1501.

Next, the check item list creation processing unit 122 causes the condition determining unit 123 to determine whether the device 20, which is the device 20 whose device ID is obtained to be maintained, satisfies a check condition of the check candidate information in step S1502.

That is, the condition determining unit 123 determines whether the device 20 satisfies the check condition based on the device information on the device 20.

For example, in the check candidate information on a check ID "M001", a target data item name is the "NUMBER OF TIMES OF JAM" and a check condition is "ONE TIME OR MORE FROM LAST MONTH". Accordingly, in this case, the condition determining unit 123 determines whether a total of "NUMBER OF TIMES OF JAM" included in the latest device information from the last month in the device 20 is greater than or equal to "1". In a case where the total of "NUMBER OF TIMES OF JAM" is greater than or equal to "1", the condition determining unit 123 determines that the device 20 satisfies the check condition. On the other hand, in a case where the total of "NUMBER OF TIMES OF JAM" is not greater than or equal to "1", the condition determining unit 123 determines that the device 20 does not satisfy the check condition.

Similarly, for example, in the check candidate information on a check ID "M003", target data item names are "COLOR COUNTER" and "COVERAGE", and check conditions are "AVERAGE OF LAST MONTH IS 60% OR MORE" and "AVERAGE OF LAST MONTH IS 20% or MORE", respectively. Accordingly, in this case, the condition determining unit 123 determines whether an average of "COLOR COUNTER" and an average of "COVERAGE" included in the latest device information from the last month in the device 20 are "60% OR more" and "20% OR more", respectively. Then, in a case where the average of "COLOR COUNTER" and the average of "COVERAGE" are "60% OR MORE" and "20% OR MORE", respectively, the condition determining unit 123 determines that the device 20 satisfies the check condition(s). On the other hand, in a case where the average of "COLOR COUNTER" and the average of "COVERAGE" are not "60% OR MORE" and "20% OR MORE", respectively, the condition determining unit 123 determines that the device 20 does not satisfy the check condition.

The check condition may include a condition relating to a record (history) of checking a component included in the device 20 or the device 20, for example. Specifically, the check condition may include "THE NUMBER OF TIMES OF CHECKING COMPONENT A IS 1 TIME OR MORE FROM LAST YEAR" or the like. In this case, when the component A has been checked for one or more times in the last year or this year, the check condition is satisfied.

In a case where the condition determining unit 123 determines that the device 20 satisfies the check condition (YES in step S1502), the check item list creating unit 124 adds, to the check item list in step S1503, the check item name included in the check candidate information.

For example, for the check item list, a blank list is previously created for each device ID to be maintained. However, the present disclosure is not limited to this. For example, the check item list, for each of device IDs to be maintained, may be a previously created list in which check items that are common between the devices 20 of the device IDs are stored.

On the other hand, in a case where the condition determining unit 123 determines that the device 20 does not satisfy the check condition (NO in step S1502), the check item list creation processing unit 122 proceeds to a process of step S1504.

Next, the check item list creation processing unit 122 determines whether check candidate information corresponding to a next check ID is present (stored) in the check candidate information storage unit 170 in step S1504. That is, the check item list creation processing unit 122 determines whether check candidate information on a check ID that has not been obtained yet in the device 20 is present.

In a case of determining that the check candidate information corresponding to the next check ID is present (YES in step S1504), the check item list creation processing unit 122 obtains the check candidate information corresponding to the next check ID from the check candidate information storage unit 170 in step S1506, and the processing returns to step S1502.

On the other hand, in a case of determining that the check candidate information corresponding to the next check ID is not present (NO in step S1504), the check item list creation processing unit 122 finishes the processing.

As described above, the device managing system 1 according to the first embodiment creates, for each device 20 to be maintained (that is, for each device 20 of which a busy period is near), a list of check items that satisfy check conditions from check candidates. In this way, according to the device managing system 1 of the first embodiment, it is possible to create, for each device 20 to be maintained, a list of appropriate check items in accordance with at least one of status of the device 20 to be maintained, a way of using the device 20 to be maintained, a record (history) of checking the device 20 to be maintained, and the like. In other words, it is possible to create, for each device 20 to be maintained, the list of check items to be performed on the device 20 to be maintained.

Figure 16:
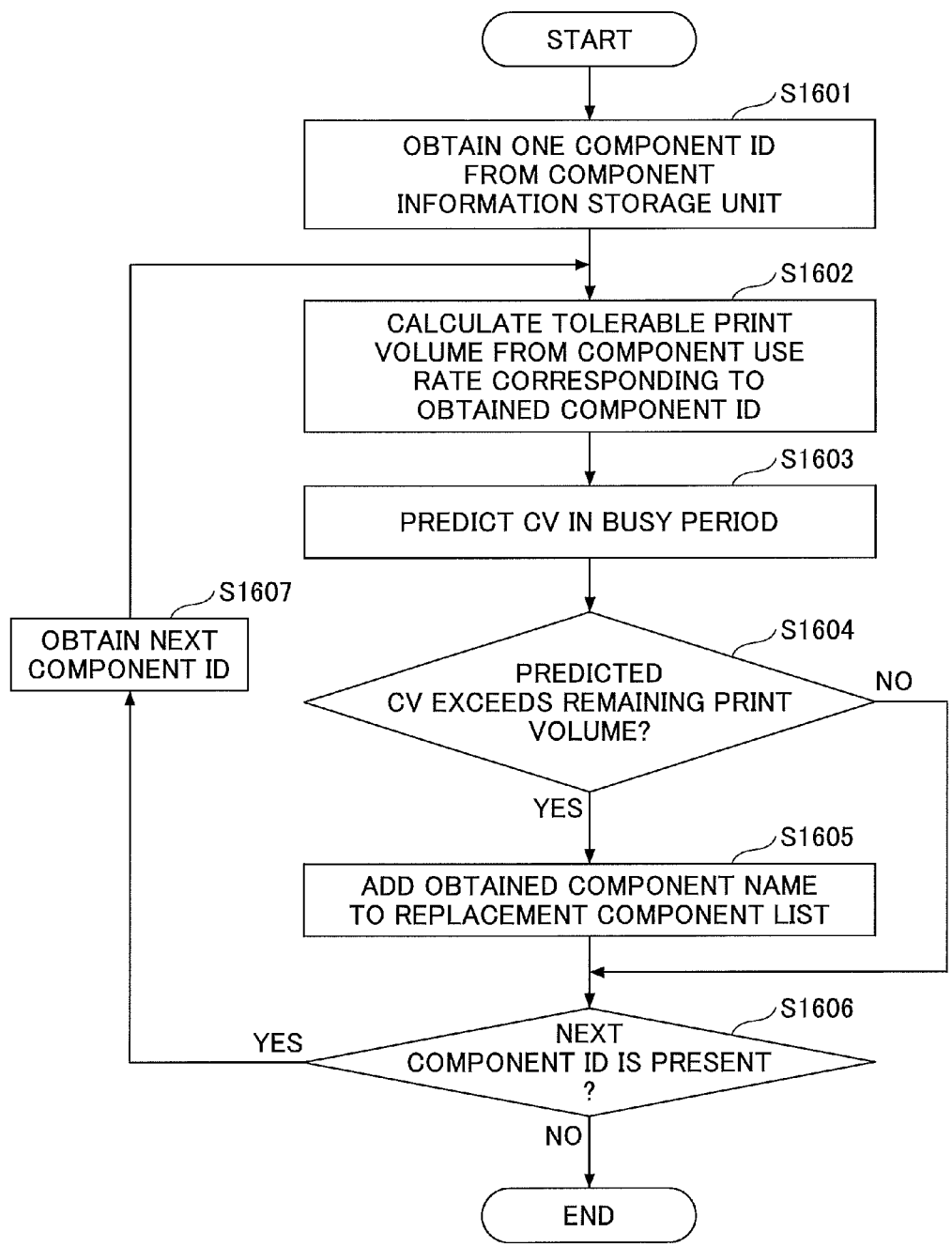
FIG. 16 is a flowchart illustrating an example of processing of creating a replacement component list according to the first embodiment.

The processing of creating the replacement component list in step S1303 of FIG. 13 will be described with reference to FIG. 16. FIG. 16 is a flowchart illustrating an example of the processing of creating the replacement component list according to the first embodiment.

First, the replacement component list creation processing unit 125 obtains one component ID from the component information stored in the component information storage unit 180 in step S1601.

Next, the replacement component list creation processing unit 125 causes the calculating unit 126 to calculate a remaining print volume of the component corresponding to the obtained component ID in the device 20 in step S1602. That is, the calculating unit 126 calculates the remaining print volume based on a rate of using the component included in the latest device information on the device 20 and a tolerable print volume of the component corresponding to the component ID.

For example, in a case where the component ID is "P001", the calculating unit 126 calculates the remaining print volume of the component A in the device 20 based on "USE RATE OF COMPONENT A" included in the latest device information on the device 20 and the tolerable print volume "50000" of the component name "COMPONENT A" included in the component information. Specifically, for example, in a case where the "USE RATE OF COMPONENT A" is "80%", the calculating unit 126 calculates that the remaining print volume of the component A in the device 20 is "10000".

Next, the replacement component list creation processing unit 125 causes the predicting unit 127 to predict a print volume (Copy volume) in a busy period of the device 20 in step S1603. That is, the predicting unit 127 calculates the predicted CV in the busy period of the device 20. Here, for example, the predicting unit 127 may calculate the predicted CV by use of a predictive model obtained based on print volumes (Copy Volumes) for respective months of the device 20 and a changing trend of the print volume. Such a predictive model can be obtained by a multi-regression analysis.

Next, the replacement component list creation processing unit 125 causes the exceedance determining unit 128 to determine in step S1604 whether the predicted copy volume calculated in step S1603 exceeds the remaining print volume calculated in step S1602. That is, the exceedance determining unit 128 determines whether the predicted copy volume in the busy period of the device 20 exceeds the remaining print volume of the component.

In a case where the exceedance determining unit 128 determines that the predicted copy volume exceeds the remaining print volume (YES in step S1604), the replacement component list creating unit 129 obtains the component name of the component from the component information storage unit 180. Then, the replacement component list creating unit 129 adds the obtained component name to the replacement component list in step S1605. For example, for the replacement component list, a blank list is previously created for each device ID to be maintained.

On the other hand, in a case where the exceedance determining unit 128 determines that the predicted copy volume does not exceed the remaining print volume (NO in step S1604), the replacement component list creation processing unit 125 proceeds to a process of step S1606.

Next, the replacement component list creation processing unit 125 determines whether component information on a next component ID is stored in the component information storage unit 180 in step S1606. That is, the replacement component list creation processing unit 125 determines whether the component information on a component ID that has not been obtained yet in the device 20 is stored.

In a case of determining that the component information on the next component ID is stored in the component information storage unit 180 (YES in step S1606), the replacement component list creation processing unit 125 obtains the next component ID in step S1607, and the processing returns to step S1602. In this way, the replacement component list creation processing unit 125 executes, for each of the devices 20 to be maintained, the processes of steps S1602 to S1606 with respect to the component IDs managed in the component information storage unit 180.

On the other hand, in a case of determining that the component information on the next component ID is not stored in the component information storage unit 180 (NO in step S1606), the replacement component list creation processing unit 125 finishes the processing.

As described above, the device managing system 1 according to the first embodiment calculates, for each device 20 to be maintained (that is, for each device 20 of which a busy period is near), a predicted copy volume of the device 20 in the busy period to create a list (replacement component list) of components that are required to be replaced before the busy period. Thus, according to the device managing system 1 of the first embodiment, it is possible to create the list of the appropriate replacement components in accordance with the predicted copy volume in the busy period of the device 20 to be maintained.

Second Embodiment

A second embodiment will be described. In the descriptions of the second embodiment, differences between the second embodiment and the first embodiment will be mainly described. Reference numerals, similar to the reference numerals used in the descriptions of the first embodiment, are given to parts of the second embodiment, which have functions substantially similar to those of the first embodiment, and parts of the second embodiment, which execute processing substantially similar to that of the first embodiment, such that and their descriptions may be omitted as appropriate.

According to the second embodiment, for example, in a case where the device 20 is replaced, a busy period of the device 20 after the replacement is determined in consideration of device information on the device 20 before the replacement. Thus, according to the second embodiment, it is possible to determine a busy period even in an early period after the replacement of the device 20. Here, in the following descriptions, the device 20 before the replacement is referred to as the "old device 20".

<Functional Configuration>

Figure 17:
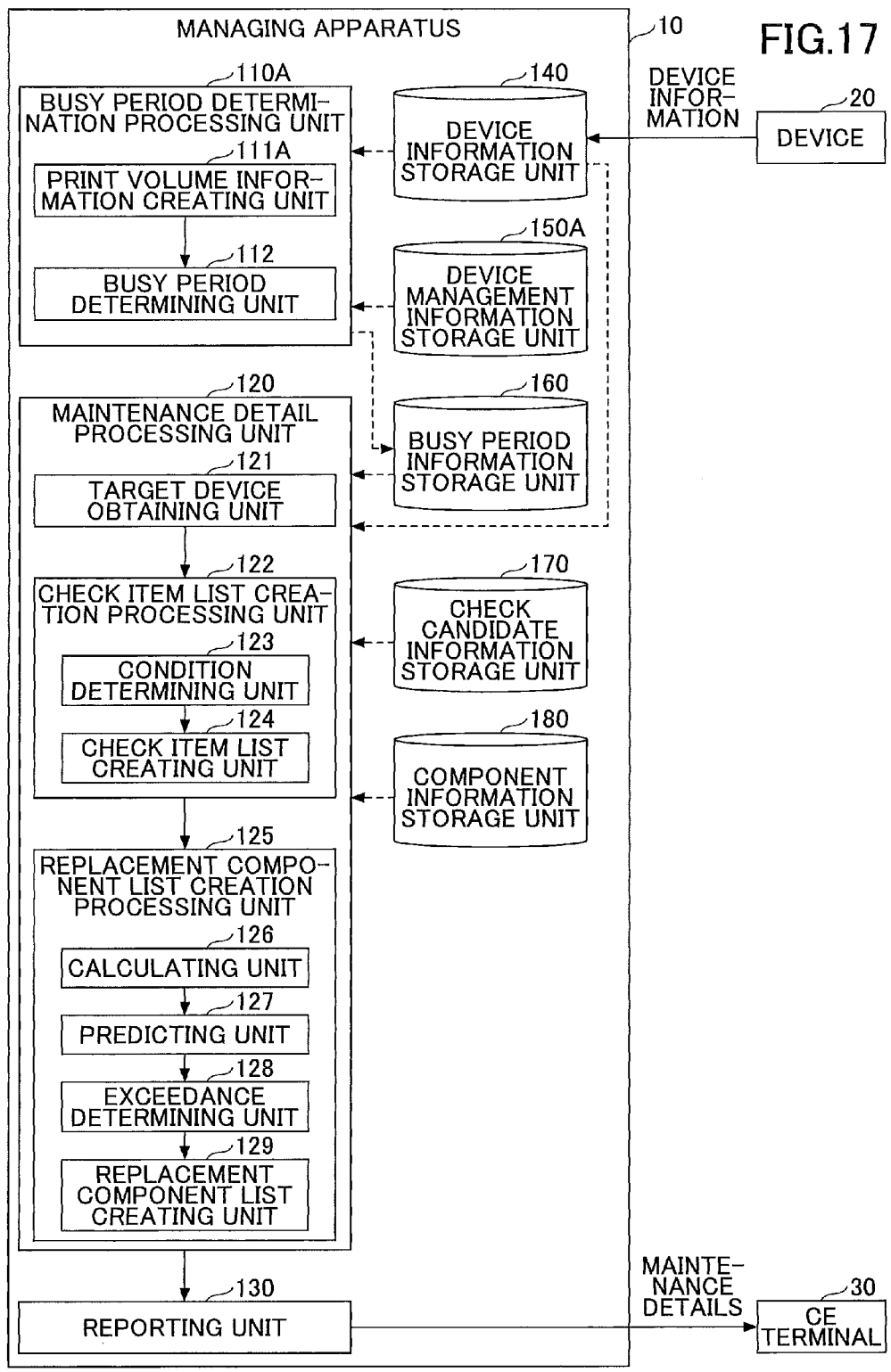
FIG. 17 is a block diagram illustrating an example of a functional configuration of a managing apparatus according to a second embodiment.

A functional configuration of the managing apparatus 10 according to the second embodiment will be described with reference to FIG. 17. FIG. 17 is a block diagram illustrating an example of the functional configuration of the managing apparatus 10 according to the second embodiment.

The managing apparatus 10 illustrated in FIG. 17 includes a busy period determination processing unit 110A. Further, the managing apparatus 10 includes a device management information storage unit 150A.

The busy period determination processing unit 110A performs processing to determine, for each device ID stored in the device management information storage unit 150A, a busy period in consideration of print volumes of an old device 20 as well. Here, the busy period determination processing unit 110A includes a print volume creating unit 111A.

Based on device information on a device 20 and device information on an old device 20, the print volume information creating unit 111A calculates print volumes (copy volumes) of respective months of the device 20 to create print volume information on the print volumes of the respective months.

The device management information storage unit 150A stores device management information. Here, the device management information stored in the device management information storage unit 150A will be described with reference to FIG. 18. FIG. 18 is a table illustrating an example of the device management information according to the second embodiment.

As illustrated in FIG. 18, in the device management information, respective device IDs (A001 to A003) are further associated with old device IDs, which represent device IDs of old devices 20. In FIG. 18, the device ID A002 (new device ID) is associated with the old device ID A101.

Each of the device IDs A001 and A003 is associated with "ABSENCE" which indicates that the device 20 is not replaced. That is, for example, in a case where the device 20 is replaced, the device ID of the device 20 after the replacement is associated with the device ID of the device 20 before the replacement in the device management information.

<Details of Processing>

Details of processing of the device managing system 1 according to the second embodiment will be described.

Figure 19:
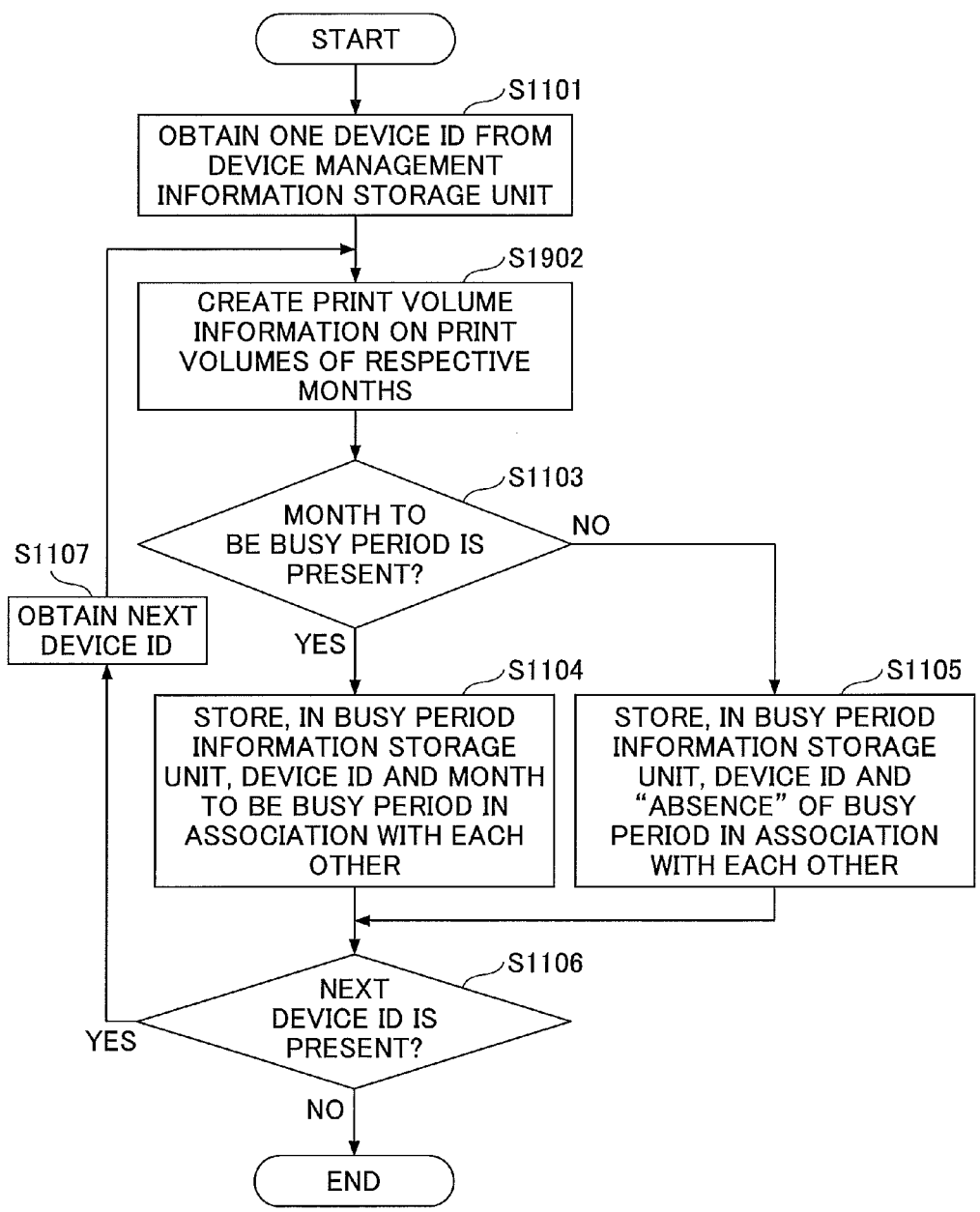
FIG. 19 is a flowchart illustrating an example of processing of determining a busy period according to the second embodiment.

Processing of determining, in consideration of device information on the old device 20 as well, a busy period of the device 20 and creating busy period information will be described with reference to FIG. 19. FIG. 19 is a flow chart illustrating an example of the processing of determining the busy period according to the second embodiment. Because processes in steps S1101, and S1103 to S1107 of FIG. 18 are similar to the processes in steps S1101, and S1103 to S1107 of the first embodiment, descriptions of the processes in steps S1101, and S1103 to S1107 are omitted.

Subsequent to step S1101, the busy period determination processing unit 110A causes the print volume information creating unit 111A to create print volume information, which represents print volumes for respective months of the device 20 represented by the obtained device ID in step S1902.

Here, in a case where an old device ID is associated with the obtained device ID in the device management information, the print volume information creating unit 111A creates the print volume information on the print volumes of the respective months based on device information on the old device corresponding to the old device ID as well. It should be noted that in a case where an old device ID is not associated with the device ID in the device management information, the processing is executed in a manner similar to the first embodiment. In other words, when the device 20 has not been replaced, the processing is executed in a manner similar to that of the first embodiment.

Here, FIG. 20 illustrates print volume information 300 that represents, for respective months, print volumes of the device 20 of which the device ID "A002" is associated with the old device ID "A101" in the device management information. As illustrated in FIG. 20, for example, in a case where the old device has been replaced with the device 20 (new device) on "April, 2014", the print volume information on print volumes of respective months in the period before the replacement is created based on the device information on the old device 20. On the other hand, the print volume information on print volumes of respective months in the period after the replacement is created based on the device information on the device 20 (new device).

In this way, when the device 20 has been replaced, the print volume information on the print volumes of the respective months is created based on the device information on the old device 20 corresponding to the device 20 as well.

As described above, when the device 20 has been replaced, the device managing system 1 according to the second embodiment creates the print volume information on the print volumes for the respective months of the device 20 based on the device information on the device 20 before the replacement and the device information on the device 20 after the replacement. In this way, according to the device managing system 1 of the second embodiment, for example, it becomes possible to determine a busy period even in an early period after the replacement of the device 20 and to determine the more accurate busy period.

When the device 20 has been replaced (that is, when the old device ID is associated with the device management information), the predicted copy volume may be calculated, in step S1604 of the processing of creating the replacement component list, by use of a predictive model that is based on print volumes (copy volumes) of respective months of the old device 20 as well.

Third Embodiment

A third embodiment will be described. In the descriptions of the third embodiment, differences between the third embodiment and the first embodiment will be mainly described. Reference numerals, similar to the reference numerals used in the descriptions of the first embodiment, are given to parts of the third embodiment, which have functions substantially similar to those of the first embodiment, and parts of the third embodiment, which execute processing substantially similar to that of the first embodiment, such that and their descriptions may be omitted as appropriate.

According to the third embodiment, a busy period is determined for each customer. Further, maintenance details for each customer are reported to the CE terminal 30. In this way, for example, it is possible to determine, for each customer, that a busy period of one or more devices 20 that are used by the customer is the same month. That is, it is possible to determine, for each customer, that the devices 20 installed in the customer environment of the customer have the same busy period. Further, the workman such as the customer engineer can effectively perform maintenance work on each device 20 that the same customer has before the busy period.

<Functional Configuration>

Figure 21:
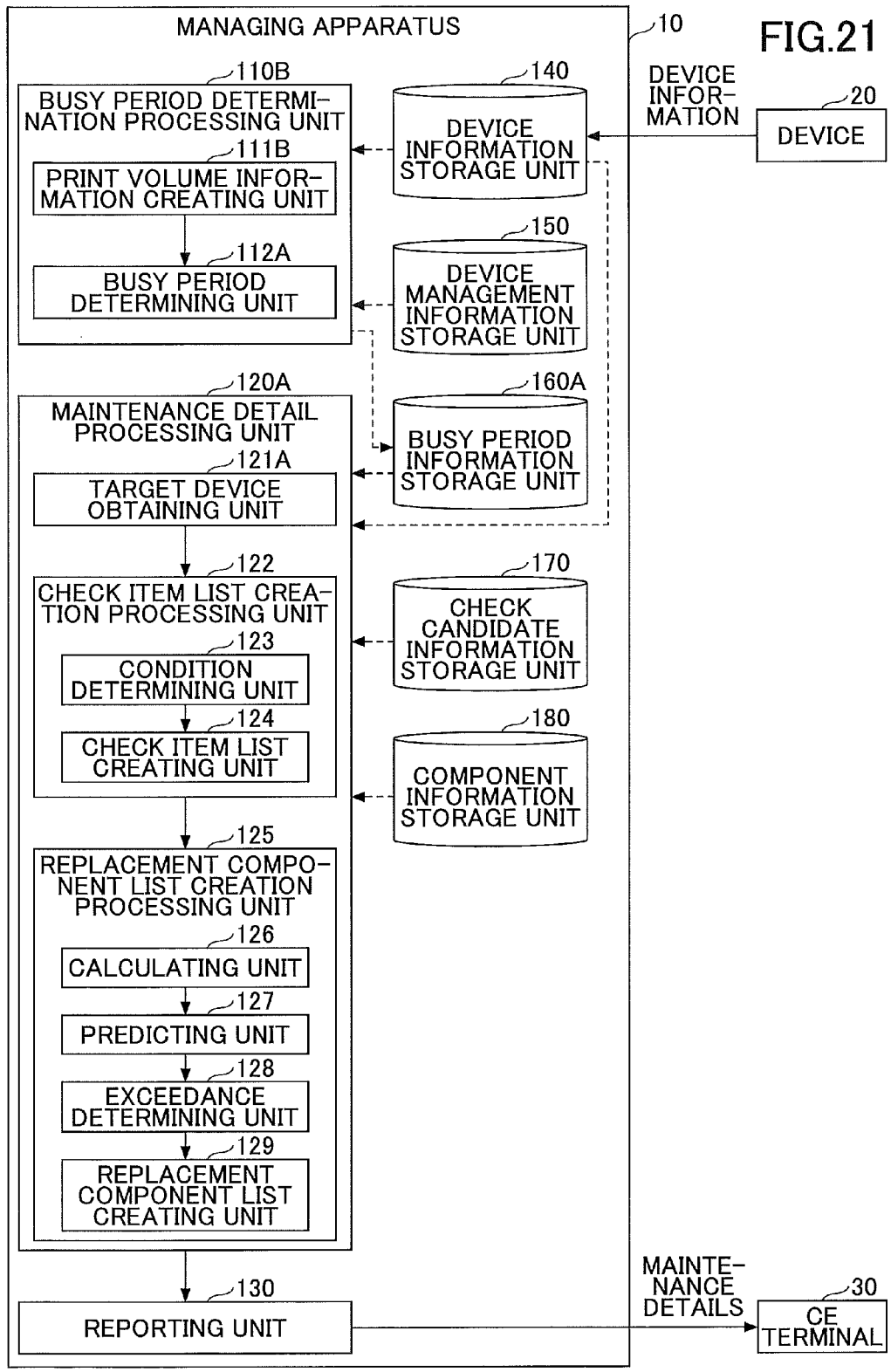
FIG. 21 is a block diagram illustrating an example of a functional configuration of a managing apparatus according to a third embodiment.

A functional configuration of the managing apparatus 10 according to the third embodiment will be described with reference to FIG. 21. FIG. 21 is a block diagram illustrating an example of the functional configuration of the managing apparatus 10 according to the third embodiment.

The managing apparatus 10 illustrated in FIG. 21 includes a busy period determination processing unit 110B and a maintenance detail processing unit 120A. Further, the managing apparatus 10 includes a busy period information storage unit 160A.

The busy period determination processing unit 110 performs processing to determine a busy period for each customer ID stored in the device management information storage unit 150. Here, the busy period determination processing unit 110 includes a print volume information creating unit 111B and a busy period determining unit 112A.

Based on device information on each device 20 that a customer uses, the print volume information creating unit 111B calculates print volumes (copy volumes) for respective months of the customer and creates print volume information on the print volumes for the respective months of the customer.

The busy period determining unit 112B determines one or more busy periods of the customer based on the print volume information, created by the print volume information creating unit 111B, for the respective months of the customer. Then, the busy period determining unit 112A creates busy period information, which associates the customer ID of the customer with the determined busy period and the device ID(s) of the device(s) 20 that the customer uses, and stores the created busy period information in the busy period information storage unit 160A.

The maintenance detail processing unit 120A specifies a customer whose busy period is near and performs processing to create lists that are a check item list and a replacement component list. The lists represent maintenance details of the device(s) 20 that the specified customer uses. Here, the maintenance detail processing unit 120A includes a target device obtaining unit 121A.

The target device obtaining unit 121A obtains customer IDs of customers whose busy periods are near and device IDs of devices 20 that the customers use with reference to the busy period information storage unit 160A. That is, the target device obtaining unit 121A specifies the devices 20, which the customers whose busy periods are near use, as targets on which maintenance work is to be performed, and obtains the device IDs of the specified devices 20 from the busy period information storage unit 160A. It should be noted that the number of customers of which busy periods are near may be 0, 1, or 2 or more. The number of devices 20 that each customer uses may be 1 or 2 or more.

The busy period information storage unit 160A stores busy period information. Here, the busy period information stored in the busy period information storage unit 160A will be described with reference to FIG. 22. FIG. 22 is a table illustrating an example of the busy period information according to the third embodiment.

As illustrated in FIG. 22, in the busy period information, customer IDs (C001 and C002) are associated with busy periods and device IDs. In FIG. 22, the customer ID C001 is associated with the device IDs A001 and A002, and the customer ID C002 is associated with the device ID A003. That is, for each of the customers, a busy period of a customer and one or more devices 20 that the customer uses are managed in the busy period information storage unit 160.

<Details of Processing>

Details of processing of the device managing system 1 according to the third embodiment will be described.

Figure 23:
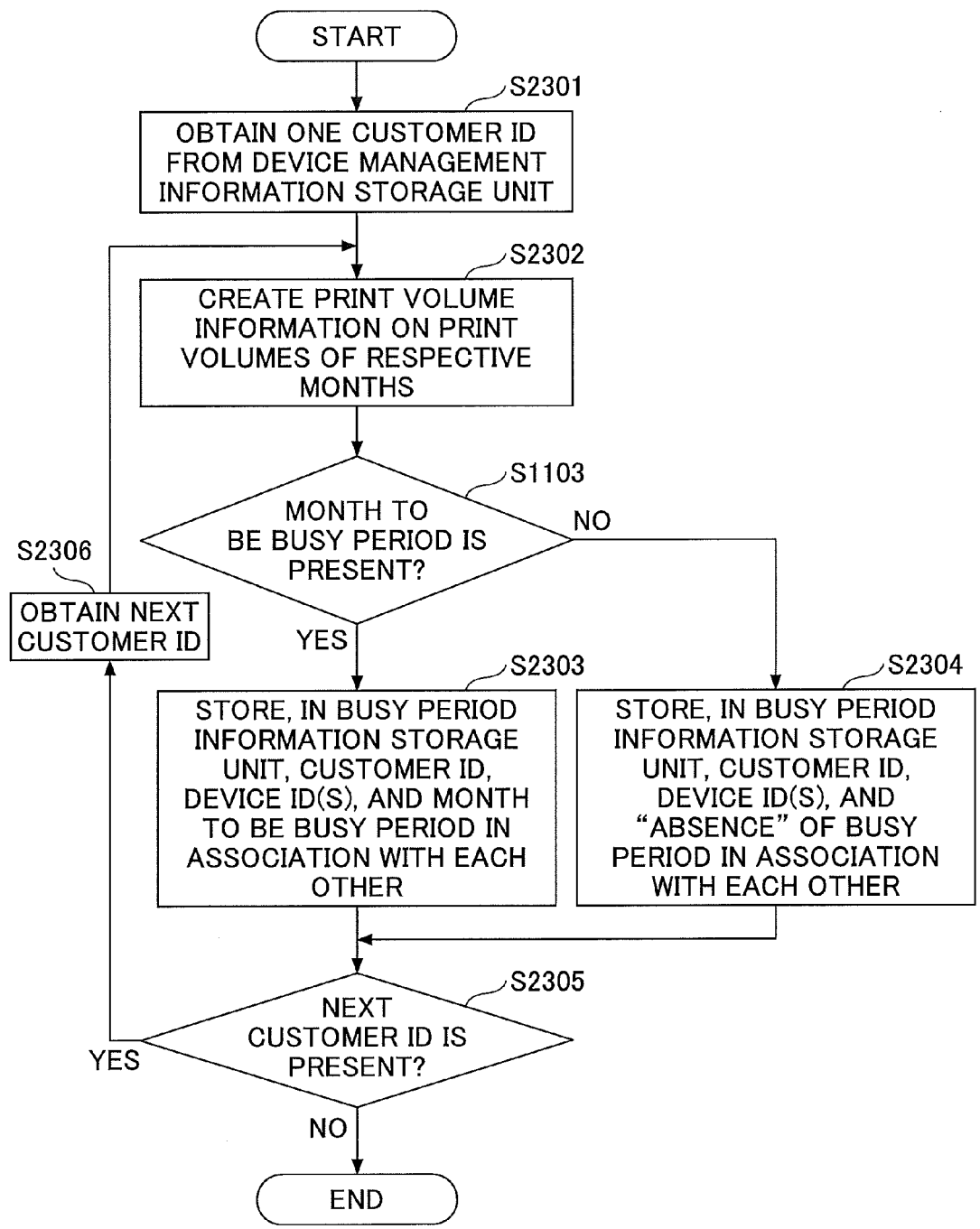
FIG. 23 is a flowchart illustrating an example of processing of determining the busy period according to the third embodiment.

Processing of determining, for each costumer, a busy period of a customer and creating busy period information will be described with reference to FIG. 23. FIG. 23 is a flowchart illustrating an example of processing of determining the busy period according to the third embodiment. Because the process in step S1103 is similar to that of the first embodiment, a description of the process in step S1103 is omitted.

First, the busy period determination processing unit 110B obtains one customer ID from the device management information stored in the device management information storage unit 150 in step S2301.

Next, in step S2301, the busy period determination processing unit 110B causes the print volume information creating unit 111B to create print volume information on print volumes for respective months of the customer represented by the obtained customer ID.

Here, for example, based on print volume information on print volumes of respective months of each device 20 that the customer uses, the print volume information creating unit 111B may calculate an average and/or a maximum value of each month to create the print volume information on the print volumes of the respective months of the customer.

For example, when a print volume of the device ID "A001" in February, 2014 is "14520" and a print volume of the device ID "A002" in February, 2014 is "12480", the print volume information creating unit 111B calculates that the print volume of the customer ID "C001" in February, 2014 is "13500". This is because the average of "14520" and "12480" is "13500" when calculating an average of a print volume for each month. Print volumes of other months are calculated similarly.

In a case of determining that the month to be the busy period is present (YES in step S1103), the busy period determining unit 112A creates busy period information that associates the customer ID with device IDs of the respective devices 20 that the customer of the customer ID uses and the month to be the busy period. Then, the busy period determining unit 112A stores the created busy period information in the busy period information storage unit 160A in step S2303.

On the other hand, in a case of determining that there is no month to be the busy period (NO in step S1103), the busy period determining unit 112A creates busy period information that associates the customer ID with device IDs of the respective devices that the customer of the customer ID uses and "ABSENCE", which indicates that there is no month to be the busy period.

Then, the busy period determining unit 112A stores the created busy period information in the busy period information storage unit 160A in step S2304.

Next, the busy period determination processing unit 110B determines whether a next customer ID is included in the device management information stored in the device management information storage unit 150 in step S2305. That is, the busy period determination processing unit 110B determines whether there is a customer ID, which has not been obtained yet.

In a case of determining that the next customer ID is included in the device management information stored in the device management information storage unit 150 (YES in step S2305), the busy period determination processing unit 110B obtains the next customer ID in step S2306, and the processing returns to step S2302. In this way, the busy period determination processing unit 110B executes the processes of steps S2302 to S2306 for each of the customer IDs managed in the device management information storage unit 150.

On the other hand, in a case of determining that the next customer ID is not included in the device management information stored, in the device management information storage unit 150 (NO in step S2305), the busy period determination processing unit 110B finishes the processing.

As described above, according to the device managing system 1 of the third embodiment, the busy periods of the respective customers are managed in the managing apparatus 10.

Figure 24:
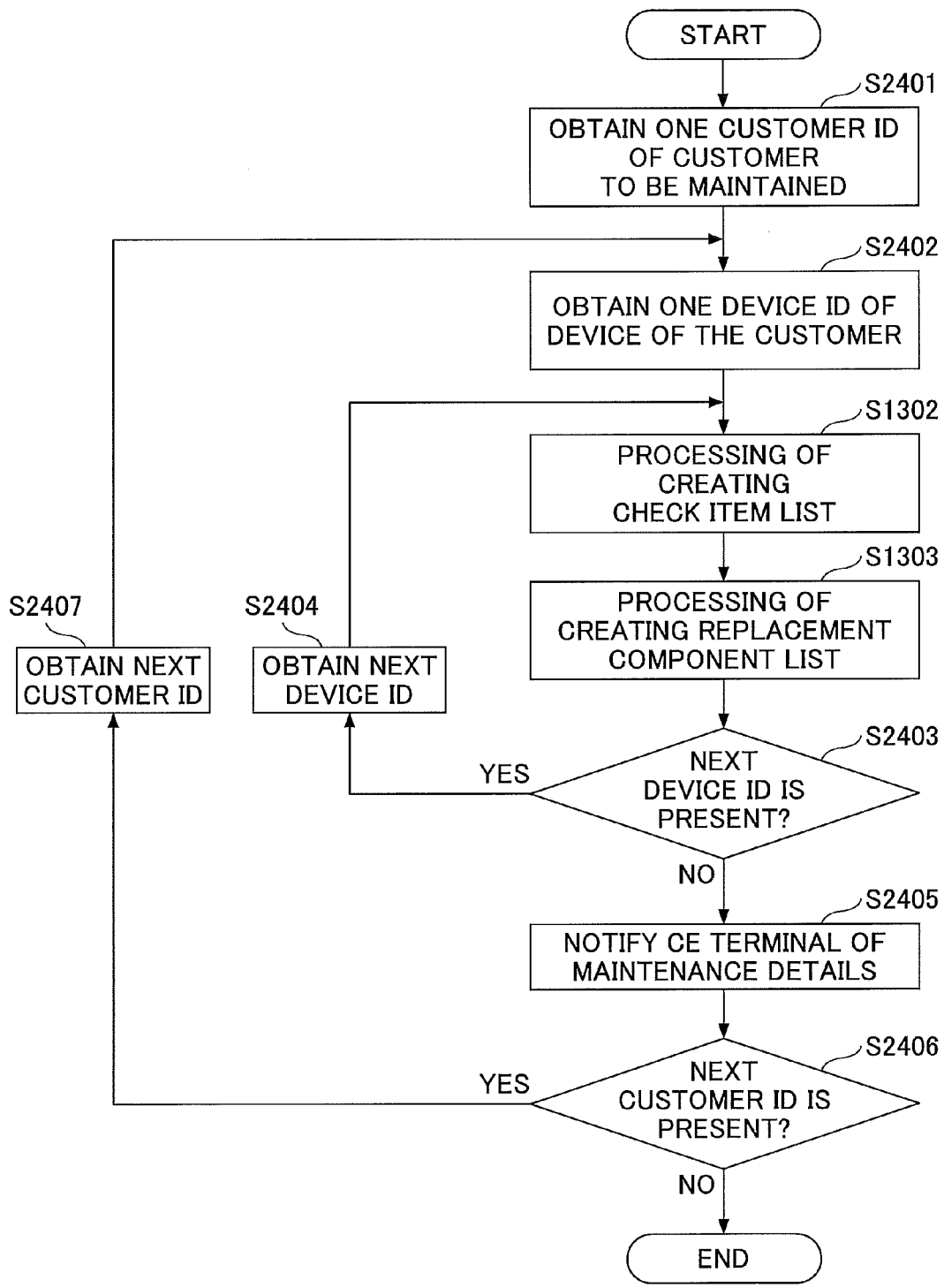
FIG. 24 is a flowchart illustrating an example of processing of reporting maintenance details according to the third embodiment.

Processing of specifying devices 20, which are used by customers whose busy periods are near, as targets on which maintenance is to be maintained and reporting details of the maintenance for the specified devices 20 to the CE terminal 30 will be described with reference to FIG. 24. FIG. 24 is a flowchart illustrating an example of processing of reporting maintenance details according to the third embodiment. Because processes in steps S1302 and S1303 in FIG. 24 are similar to the processes in steps S1302 and S1303 of the first embodiment, descriptions of the processes in steps S1302 and S1303 are omitted.

First, the maintenance detail processing unit 120A causes the target device obtaining unit 121A to obtain a customer ID of the customer, for which maintenance work is to be performed, from the busy period information storage unit 160A in step S2401.

That is, the target device obtaining unit 121A specifies, from among a plurality of customers of the busy period information stored in the busy period information storage unit 160, the customer of which the busy period is near. For example, the target device obtaining unit 121 specifies a customer of which the busy period is two months after. Then, the target device obtaining unit 121A obtains the one specified customer ID from the busy period information.

Next, the maintenance detail processing unit 120A causes the target device obtaining unit 121A to obtain one device ID associated with the obtained customer ID in step S2402. That is, the target device obtaining unit 121A obtains one device ID included in the busy period information on the obtained customer ID.

Subsequent to step S1303, the maintenance detail processing unit 120A causes the target device obtaining unit 121A to determine whether a next device ID is present in step S2403. That is, the target device obtaining unit 121A determines whether a next device ID, which has not been obtained yet, is present among one or more device IDs associated with the customer ID.

In a case of determining that the next device ID is present (YES in step S2403), the target device obtaining unit 121A obtains the next device ID in step S2404, and the processing returns to step S1302. In this way, the maintenance detail processing unit 120A executes, for each of the customers of which busy periods are near, the processes of steps S1302 and S1303 with respect to one or more device IDs of the devices 20 that the customer uses.

On the other hand, in a case of determining that the next device ID is not present (NO in step S2403), the reporting unit 130 notifies the CE terminal 30 of the check item list and the replacement component list as maintenance details to request maintenance work in step S2405. In this way, the reporting unit 130 reports, for each of the customers of which busy periods are near, the maintenance details of one or more devices 20 that the customer uses to the CE terminal 30.

In this way, according to the device managing system 1 of the third embodiment, a workman such as a customer engineer can perform, for each of the customers of which busy periods are near, maintenance work on one or more devices 20 that the customer uses.

Next, in step S2406, the maintenance detail processing unit 120A causes the target device obtaining unit 121A to determine whether a next customer ID, which has not been obtained yet, is included in the busy period information. That is, the target device obtaining unit 121A determines whether there is the next device ID of which the busy period is near.

In a case of determining that the next customer ID is included in the busy period information (YES in step S2406), the target device obtaining unit 121A obtains the next customer ID in step S2407, and the processing returns to step S2402. In this way, the maintenance detail processing unit 120A executes the processes of steps S2402 to S2406 with respect to each of the customer IDs of which busy periods are near among the customer IDs included in the busy period information managed in the busy period information storage unit 160A.

On the other hand, in a case of determining that the next customer ID is not included in the busy period information (NO in step S2406), the maintenance detail processing unit 120A finishes the processing.

As described above, the device managing system 1 according to the third embodiment creates, for each of the customers of which the busy periods are near, the appropriate check item list and the appropriate replacement component list as the details of the maintenance work with respect to each device 20 that the customer uses and requests the workman to perform the maintenance work. In this way, according to the device managing system 1 of the third embodiment, it is possible to effectively perform the maintenance work for each of the customers of which the busy periods are near.

In the processing of reporting the maintenance details illustrated in FIG. 24, the check item list is created for each of the devices 20 that the customers whose busy periods are near use. However, the present disclosure is not limited to this. A check item list may be created for each customer. In this way, it is possible to create check item lists for uniformly checking the devices 20 that the customers whose busy periods are near use.

It should be noted that the above described apparatus according to the embodiment may be realized by a device memory, which stores at least one program, and at least one processor, which executes the at least one program to execute the processing as described in the embodiment. In other words, the managing apparatus 10 may be realized by the device memory and the at least one processor, for example. For example, the device memory and the at least one processor can implement functions as described in the embodiments and may be implemented by hardware elements as described in the embodiments. Here, at least one program may be stored in a non-transitory recording medium that causes the managing apparatus to execute processing as described in the embodiments.

The order of the method of the present disclosure is not limited to the order of processes of the method disclosed in the above described embodiments.

The present disclosure can be implemented in any convenient form, for example using dedicated hardware, or a mixture of dedicated hardware and software. The present disclosure may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, personal digital assistant, mobile telephone (such as a WAP or 3G-compliant phone) and so on. Because the present disclosure can be implemented as software, each and every aspect of the present disclosure thus encompasses computer software implementable on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. For example, the CPU may be implemented by one or more processors. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Further, the present disclosure is not limited to these embodiments, but various variations and modifications may be made without departing from the scope of the present disclosure.

What is claimed is:

1. An information processing system including at least one information processing apparatus, the information processing system comprising:
a memory; and
a processor that is coupled to the memory and that is configured to
determine, based on use amounts, for predetermined respective past periods, of a device, whether a period during which a use amount of the device increased is present among the past periods;
determine whether maintenance work is to be performed on the device upon determining that the period during which the use amount of the device increased is present and to decide details of the maintenance work based on a result determined;
output the details of the maintenance work when the details of the maintenance work for the device are decided;
predict, based on the use amounts for the respective past periods, a future use amount of the device for a future busy period; and
report the details of the maintenance work to an electronic apparatus, used by a workman who performs the maintenance work for the device, to display the details of the maintenance work,
wherein the processor decides the details of the maintenance work including at least one of a check item name that is in accordance with the device and a replacement component name of a component of the device that is in accordance with a predicted future use amount of the device in the future busy period.

2. The information processing system according to claim 1, wherein the period during which the use amount of the device increased is present based on the use amounts for respective past months of the device.

3. The information processing system according to claim 1, wherein the use amounts are print volumes of the device.

4. The information processing system according to claim 1,
wherein the processor determines whether the maintenance work is to be performed on the device based on a check condition, which represents a condition of a case of requiring a predetermined check, and device information, which represents operating status of the device, and
wherein, in a case where the device information satisfies the check condition, the processor decides the details of the maintenance work including the check item name corresponding to the predetermined check.

5. The information processing system according to claim 1,
wherein the processor determines, for each component included in the device, whether the maintenance work is to be performed on the device based on a maximum use amount of the component and the predicted future use amount of the device in the future busy period, and
wherein, in a case where the predicted use amount exceeds the maximum use amount, the processor decides the details of the maintenance work including the replacement component name corresponding to the component.

6. The information processing system according to claim 1, wherein, when the details of the maintenance work for the device are decided, the outputting unit reports the details of the maintenance work to the electronic apparatus that the workman, who performs the maintenance work for the device, uses.

7. The information processing system according to claim 1,
wherein the processor determines, for each device, whether the period during which the use amount of the device increased is present, and
wherein the processor determines, for each device, whether the maintenance work is to be performed on the device when the processor determines that the period during which the use amount of the device increased is present and decides, for each device, the details of the maintenance work based on the result determined.

8. The information processing system according to claim 1,
wherein the processor is configured to determine whether the component of the device is to be replaced based on the future use amount and a remaining amount of the component, and
wherein, when the future use amount exceeds the remaining amount, the processor is configured to determined that the component is to be replaced.

9. The information processing system according to claim 8,
wherein, when the processor determines that the component is to be replaced, the processor is configured to display, on the electronic apparatus, a screen including the replacement component name of the component to be replaced.

10. The information processing system according to claim 1,
wherein the processor is configured to calculate an average of the use amounts for the predetermined respective past periods, and
wherein the use amount of the busy period, during which the use amount of the device increased, is larger than the average by a predetermined amount or more.

11. An information processing method executed by a computer including a memory and a processor coupled to the memory, the information processing method comprising:
determining, based on use amounts, for predetermined respective past periods, of a device, whether a period during which an use amount of the device increased is present among the past periods;
determining whether maintenance work is to be performed on the device upon determining that the period during which the use amount of the device increased is present;
deciding details of the maintenance work based on a result determined;
outputting the details of the maintenance when the details of the maintenance work for the device are decided;
predicting, based on the use amounts for the respective past periods, a future use amount of the device for a future busy period; and
reporting the details of the maintenance work to an electronic apparatus, used by a workman who performs the maintenance work for the device, to display the details of the maintenance work,
wherein the details of the maintenance work includes at least one of a check item name that is in accordance with the device and a replacement component name of a component of the device that is in accordance with a predicted future use amount of the device in the future busy period are decided.

12. A non-transitory computer readable storage medium storing a program for causing a computer including a memory and a processor coupled to the memory to execute a process, the process comprising:
determining, based on use amounts, for predetermined respective past periods, of a device, whether a period during which an use amount of the device increased is present among the past periods;
determining whether maintenance work is to be performed on the device upon determining that the period during which the use amount of the device increased is present and deciding details of the maintenance work based on a result determined; and
outputting the details of the maintenance when the details of the maintenance work for the device are decided;
predicting, based on the use amounts for the respective past periods, a future use amount of the device for a future busy period; and
reporting the details of the maintenance work to an electronic apparatus, used by a workman who performs the maintenance work for the device, to display the details of the maintenance work,
wherein the details of the maintenance work includes at least one of a check item name that is in accordance with the device and a replacement component name of a component of the device that is in accordance with a predicted future use amount of the device in the future busy period.

* * * * *